United States Patent
Han

(10) Patent No.: US 10,534,568 B2
(45) Date of Patent: Jan. 14, 2020

(54) IMAGE FORMING APPARATUS HAVING FIRST AND SECOND DEVICES EACH HAVING SEPARATE ENERGY SAVING MODES

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/987,154

(22) Filed: May 23, 2018

(65) Prior Publication Data

US 2018/0341434 A1    Nov. 29, 2018

(30) Foreign Application Priority Data

May 24, 2017  (JP) .................................. 2017-103095

(51) Int. Cl.
*G06F 3/12* (2006.01)
*H04N 1/00* (2006.01)
*H04L 29/08* (2006.01)

(52) U.S. Cl.
CPC ............ *G06F 3/123* (2013.01); *G06F 3/1221* (2013.01); *G06F 3/1225* (2013.01); *G06F 3/1231* (2013.01); *G06F 3/1288* (2013.01); *H04N 1/00938* (2013.01); *H04L 67/34* (2013.01)

(58) Field of Classification Search
None
See application file for complete search history.

(56) References Cited

U.S. PATENT DOCUMENTS 8,701,100 B2 * 4/2014 Jung ..................... G06F 8/65
717/170
9,509,657 B2 * 11/2016 Inoue .................. H04L 61/2007
(Continued)

FOREIGN PATENT DOCUMENTS

AR    2015-018295    1/2015
JP    2005-297237    10/2005
(Continued)

OTHER PUBLICATIONS

Extended European Search Report dated Aug. 30, 2018 in Patent Application No. 18173812.1 citing references AA-AB therein, 9 pages.

*Primary Examiner* — Paul F Payer
(74) *Attorney, Agent, or Firm* — Oblon, McClelland, Maier & Neustadt, L.L.P.

(57) ABSTRACT

An image forming apparatus includes a first device having first circuitry and a printer and/or a scanner, and a second device to operate the first device, the second device including second circuitry to install, on a memory of the second device, one or more applications for executing image processing using the printer or the scanner. When determining that a current time is equal to an update time set within an update time range defined by a user, the second circuitry acquires, from a server via the first device and a network, update target application information indicating a target application among the one or more applications installed in the second device, requests, to the server via the first device, downloading of the target application, acquires the target application from the server via the first device, and installs the acquired target application in the second device.

18 Claims, 27 Drawing Sheets

(56) References Cited

U.S. PATENT DOCUMENTS

| | | | |
|---|---|---|---|
| 2002/0095454 A1* | 7/2002 | Reed | G06Q 30/0601 709/201 |
| 2004/0220864 A1* | 11/2004 | Popovitch | G06F 8/60 705/26.2 |
| 2011/0022377 A1 | 1/2011 | Han et al. | |
| 2012/0062948 A1 | 3/2012 | Nishikawa | |
| 2013/0139142 A1 | 5/2013 | Ikawa et al. | |
| 2013/0145141 A1 | 6/2013 | Han et al. | |
| 2013/0174141 A1 | 7/2013 | Hirokawa et al. | |
| 2013/0174270 A1 | 7/2013 | Sugiura et al. | |
| 2013/0219261 A1 | 8/2013 | Han et al. | |
| 2014/0281914 A1 | 9/2014 | Sakawaki et al. | |
| 2014/0380502 A1 | 12/2014 | Sugiura et al. | |
| 2015/0057990 A1 | 2/2015 | Han et al. | |
| 2015/0220323 A1 | 8/2015 | Ikawa et al. | |
| 2015/0309996 A1 | 10/2015 | Han | |
| 2016/0337536 A1 | 11/2016 | Han | |
| 2016/0337544 A1 | 11/2016 | Han | |
| 2017/0078293 A1 | 3/2017 | Han | |
| 2017/0255763 A1 | 9/2017 | Han | |
| 2017/0272597 A1 | 9/2017 | Han | |

FOREIGN PATENT DOCUMENTS

| | | |
|---|---|---|
| JP | 2014-078270 | 5/2014 |
| JP | 2016-212854 | 12/2016 |

\* cited by examiner

Installer://installApp?id=49354

FIG. 13

ASSOCIATED INFORMATION

| PRODUCT ID | MODULE ID | LOWER LIMIT VERSION INFORMATION |
|---|---|---|
| xxx1 | yyy1 | z.01 |
| xxx2 | yyy2 | z.02 |
| xxx3 | yyy3 | z.03 |
| ⋮ | ⋮ | ⋮ |

IMAGE FORMING APPARATUS HAVING FIRST AND SECOND DEVICES EACH HAVING SEPARATE ENERGY SAVING MODES

CROSS-REFERENCE TO RELATED APPLICATIONS

This application is based on and claims priority pursuant to 35 U.S.C. § 119(a) to Japanese Patent Application No. 2017-103095, filed on May 24, 2017, in the Japan Patent Office, the entire disclosure of which is incorporated herein by reference.

BACKGROUND

Technical Field

This disclosure relates to an image forming apparatus, a system, and a control method.

Background Art

Conventional image forming apparatuses such as a multifunction peripheral (MFP) are configured to download and install applications from web pages. However, applications installed in an image forming apparatus might not be updated automatically.

SUMMARY

In one aspect of the present disclosure, an image forming apparatus is devised. The image forming apparatus includes a first device having first circuitry and a printer and/or a scanner, and a second device to operate the first device, the second device including second circuitry to install, on a memory of the second device, one or more applications for executing image processing using the printer or the scanner. When determining that a current time is equal to an update time set within an update time range defined by a user, the second circuitry acquires, from a server via the first device and a network, update target application information indicating a target application among the one or more applications installed in the second device, requests, to the server via the first device, downloading of the target application, acquires the target application from the server via the first device, and installs the acquired target application in the second device.

In another aspect of the present disclosure, a system is devised. The system includes a server; and an image forming apparatus communicable with the server via a network, wherein the image forming apparatus transmits an acquisition request for requesting update target application information indicating a target application, among one or more applications installed in the image forming apparatus, acquires the update target application information from the server as a response, and updates the target application indicated by the acquired update target application information, and wherein the server determines whether the target application exists when the server receives the acquisition request from the image forming apparatus, and transmits the update target application information to the image forming apparatus as a response to the acquisition request, when the server determines that the target application exists.

In another aspect of the present disclosure, a method is devised for updating an application installed in a second device of an image forming apparatus, the image forming device including a first device that includes first circuitry and at least one of a printer and a scanner, and the second device, which operates the first device, the second device including second circuitry to install, on a memory of the second device, one or more applications for executing image processing using the printer or the scanner. The method includes when determining that a current time is equal to an update time set within an update time range defined by a user, acquiring, from a server via the first device and a network, update target application information indicating a target application among the one or more applications installed in the second device; requesting, to the server via the first device and the network, downloading of the target application; acquiring the target application from the server via the first device and the network; and installing the acquired target application in the second device.

BRIEF DESCRIPTION OF THE DRAWINGS

A more complete appreciation of the description and many of the attendant advantages and features thereof can be readily obtained and understood from the following detailed description with reference to, the accompanying drawings, wherein:

FIG. 13 illustrates an example of an update prohibiting setting screen;

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosure. It should be noted that although such terms as first, second, etc. can be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present disclosure.

In addition, it should be noted that the terminology used herein is for the purpose of describing particular embodiments only and is not intended to be limiting of the present disclosure. Thus, for example, as used herein, the singular forms "a", "an", and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an image forming apparatus, a system, and a control method according to one or more embodiments of the present disclosure with reference to the accompanying drawings. Hereinafter, a description is given using a multifunction peripheral (MFP) as an example of an image forming apparatus of the embodiment, but not limited thereto. The MFP is an apparatus having a plurality of different functions, such as copy function, scanner function, printer function, and facsimile function.

Figure 1:
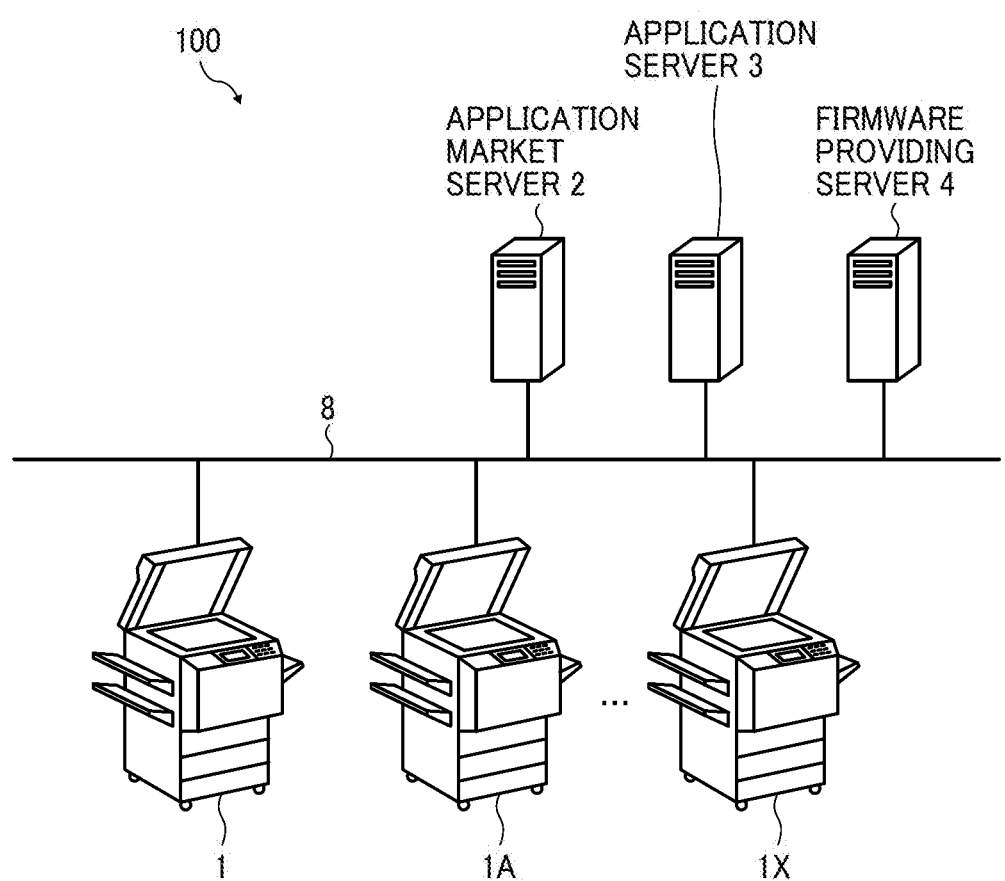
FIG. 1 illustrates an example of a configuration of a system of an embodiment.

First Embodiment:

FIG. 1 illustrates an example of a configuration of a system 100 of a first embodiment. As illustrated in FIG. 1, the system 100 includes, for example, a multifunction peripheral (MFP) 1, an application market server 2, an application server 3, and a firmware providing server 4, which are interconnected each other via a network 8 wirelessly and/or by wire. As illustrated in FIG. 1, the system 100 can include multiple MFPs (e.g., 1, 1A, 1X), each of which can perform the functionality described herein.

The application market server 2 provides an application list screen to the MFP 1, in which the application list screen includes a plurality of applications, each application being associated with an installation command of installing the application into the MFP 1, in which the installation command is an example of command instructions.

Figure 2:
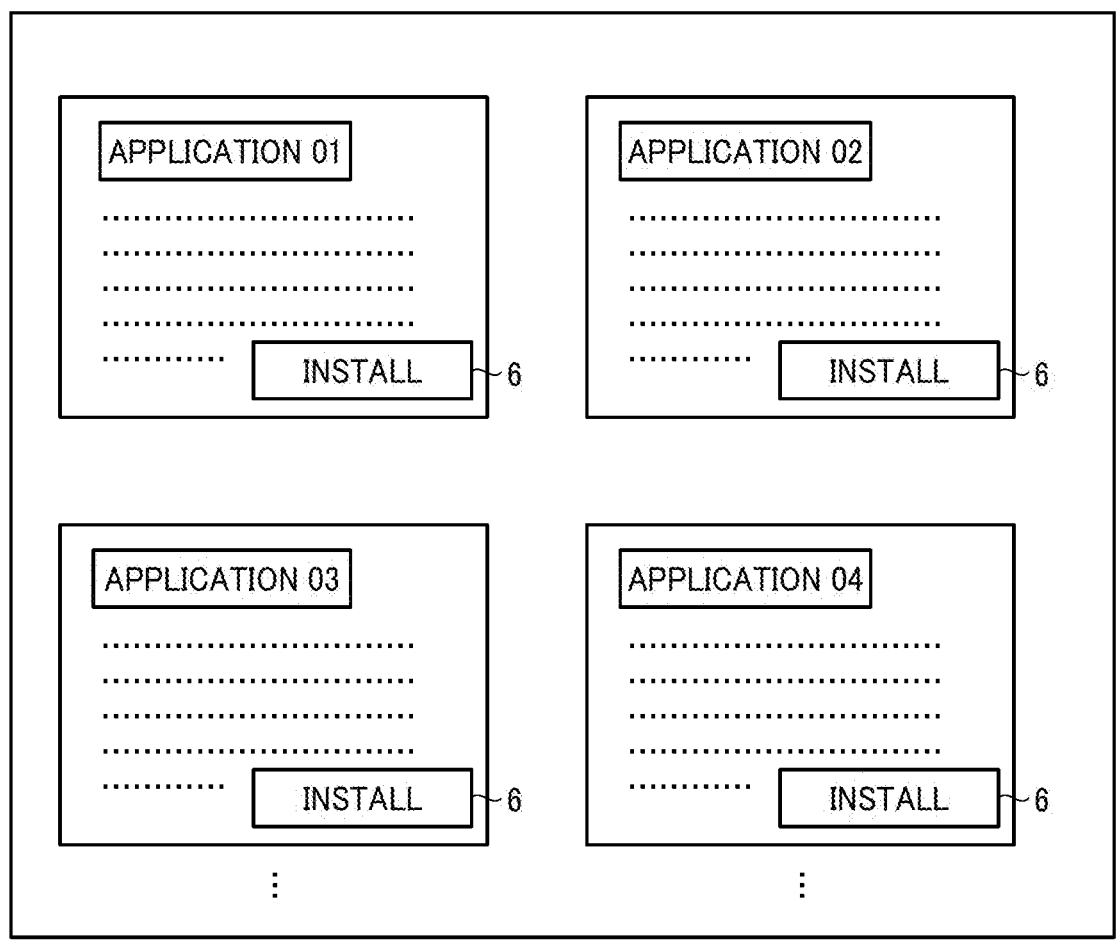
FIG. 2 illustrates an example of an application list screen such as a Web page.

FIG. 2 illustrates an example of an application list screen, such as a Web page. In the example illustrated in FIG. 2, the application list screen displays a plurality of applications, in which each application includes information describing contents of the application and a button 6 (hereinafter, "install button 6") used for instructing the installation of the application. When a user presses the install button 6 of a specific application from the application list screen displayed on the MFP 1, the specific application is downloaded and installed in the MFP 1. The details of the MFP 1 are described later.

The application server 3 stores one or more applications displayed on the application list screen, and distributes the one or more applications in response to a request received from the MFP 1. Further, the application server 3 performs version validity determination processing, described below, to determine whether the application requested by the MFP 1 can be executed in the MFP 1. The firmware providing server 4 distributes one or more firmware used for controlling the operation of the MFP 1 in response to a request from the MFP 1. The details of the application server 3 and the firmware providing server 4 are described below.

Figure 3:
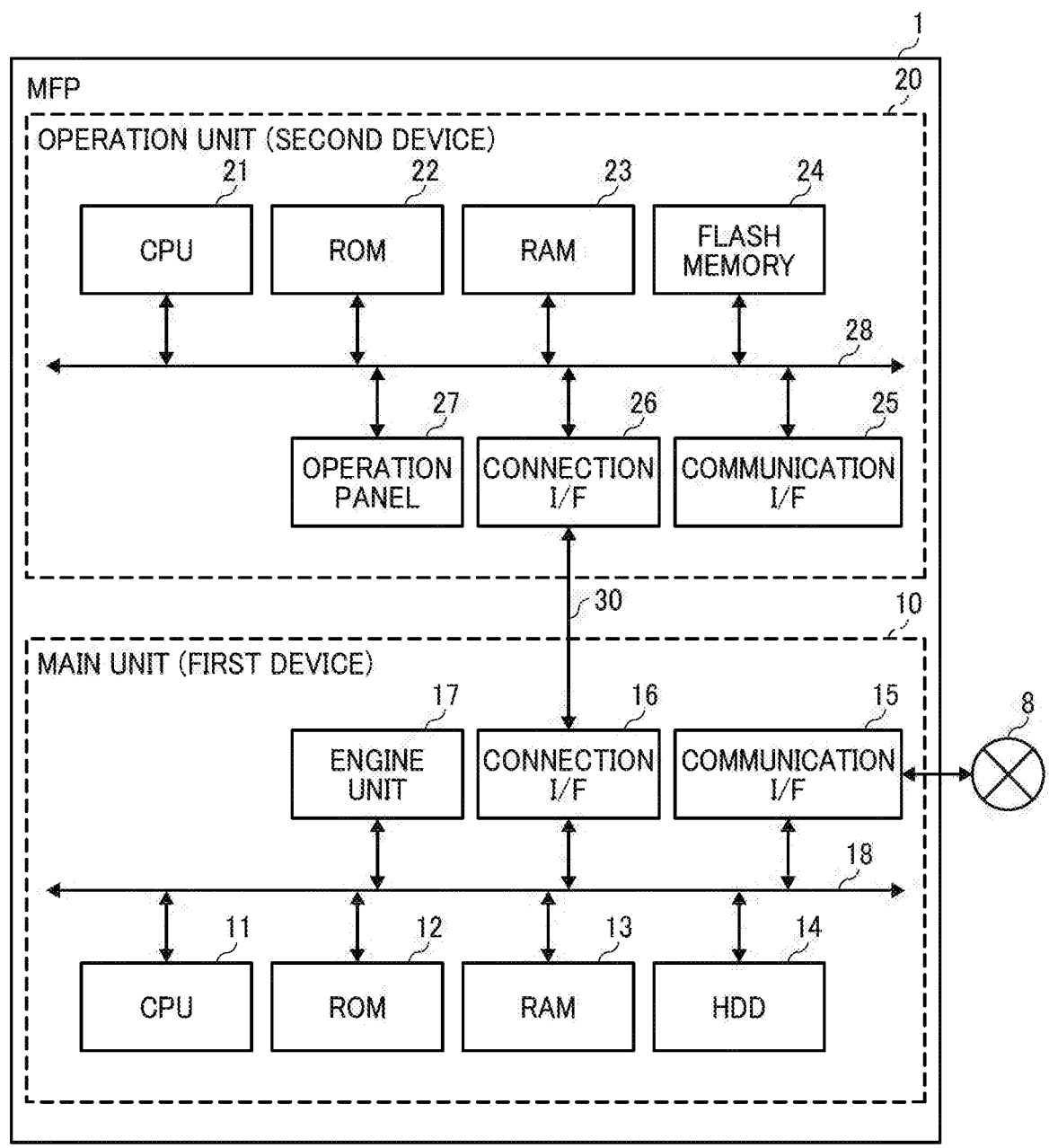
FIG. 3 illustrates an example of a hardware block diagram of an image forming apparatus.

Hereinafter, a description is given of a hardware block diagram of the MFP 1 with reference to FIG. 3. As illustrated in FIG. 3, the MFP 1 includes, for example, a main unit 10 and an operation unit 20, in which the main unit 10 is configured to implement various functions, such as a copy function, a scanner function, a facsimile function, a printer function, and the operation unit 20 is configured to receive an operation performed by a user. The main unit 10 is an example of a first device, and the operation unit 20 is an example of a second device in this disclosure, whereas the first device and the second device are included in an apparatus that performs specific processing and/or operation. The receiving of the user operation includes receiving information input in accordance with the user operation (including a signal indicating a coordinate value on a screen). In this configuration, the operation unit 20 is used as a device that instructs one or more operations to the main unit 10. The main unit 10 and the operation unit 20 are interconnected to each other through a dedicated communication path 30. The communication path 30 can employ, for example, a universal serial bus (USB) standard, but can also employ any communication standard of wired communication and wireless communication.

The main unit 10 can perform an effective operation in accordance with an operation received by the operation unit 20. Further, the main unit 10 can also communicate with an external apparatus or device, such as a client personal computer (PC), and can perform effective operations in accordance with one or more instructions received from the external apparatus. The main unit 10 includes, for example, at least an image forming unit used for forming an image on a recording medium (e.g., paper). The details of the configuration of the main unit 10 will be described below.

Hereinafter, a description is given of a hardware configuration of the main unit 10. As illustrated in FIG. 3, the main unit 10 includes, for example, a central processing unit (CPU) 11, a read only memory (ROM) 12, a random access memory (RAM) 13, a hard disk drive (HDD) 14, a communication interface (I/F) 15, a connection I/F 16, and an engine unit 17, which are interconnected to each other via a system bus 18, wirelessly and/or by wire.

In this configuration, the CPU 11, corresponding to first circuitry, controls operations of the main unit 10 entirely. The CPU 11 executes one or more programs stored in the ROM 12 or HDD 14 using the RAM 13 as a working area to control the operations of the main unit 10, with which the CPU 11 implements various functions, such as the copy function, the scanner function, the facsimile function, and the printer function.

The communication I/F 15 is an interface used for connecting with the network 8. The connection I/F 16 is an interface used for communicating with the operation unit 20 via the communication path 30.

The engine unit 17 can be configured with one or more hardware resources used for performing one or more types of processing other than general-purpose information processing and communication, such as the copy function, the scanner function, the facsimile function, and the printer function. For example, the engine unit 17 includes, for example, a scanner (image scanning unit) that scans a document image, a plotter (image forming unit) that prints images on sheets such as paper, and a facsimile unit that performs facsimile communication. Further, the engine unit 17 can include, for example, a finisher that finishes and sorts printed sheets, and an automatic document feeder (ADF) that automatically feeds documents as optional units. In this configuration, the main unit 10 can include, for example, a printer and/or a scanner.

Hereinafter, a description is given of a hardware configuration of the operation unit 20. As illustrated in FIG. 3, the operation unit 20 includes, for example, a CPU 21, a ROM 22, a RAM 23, a flash memory 24, a communication I/F 25, a connection I/F 26, an operation panel 27, and an external connection I/F 29, which are interconnected to each other via a system bus 28 wirelessly and/or by wire.

In this configuration, the CPU 21, corresponding to second circuitry, controls the operation of the operation unit 20 entirely. The CPU 21 executes one or more programs stored in the ROM 22 or the flash memory 24 using the RAM 23 as a working area to control the operation of the operation unit 20 entirely, with which the CPU 21 implements various functions to be described later, such as displaying information (e.g., image) corresponding to an input received from a user.

Figure 4:
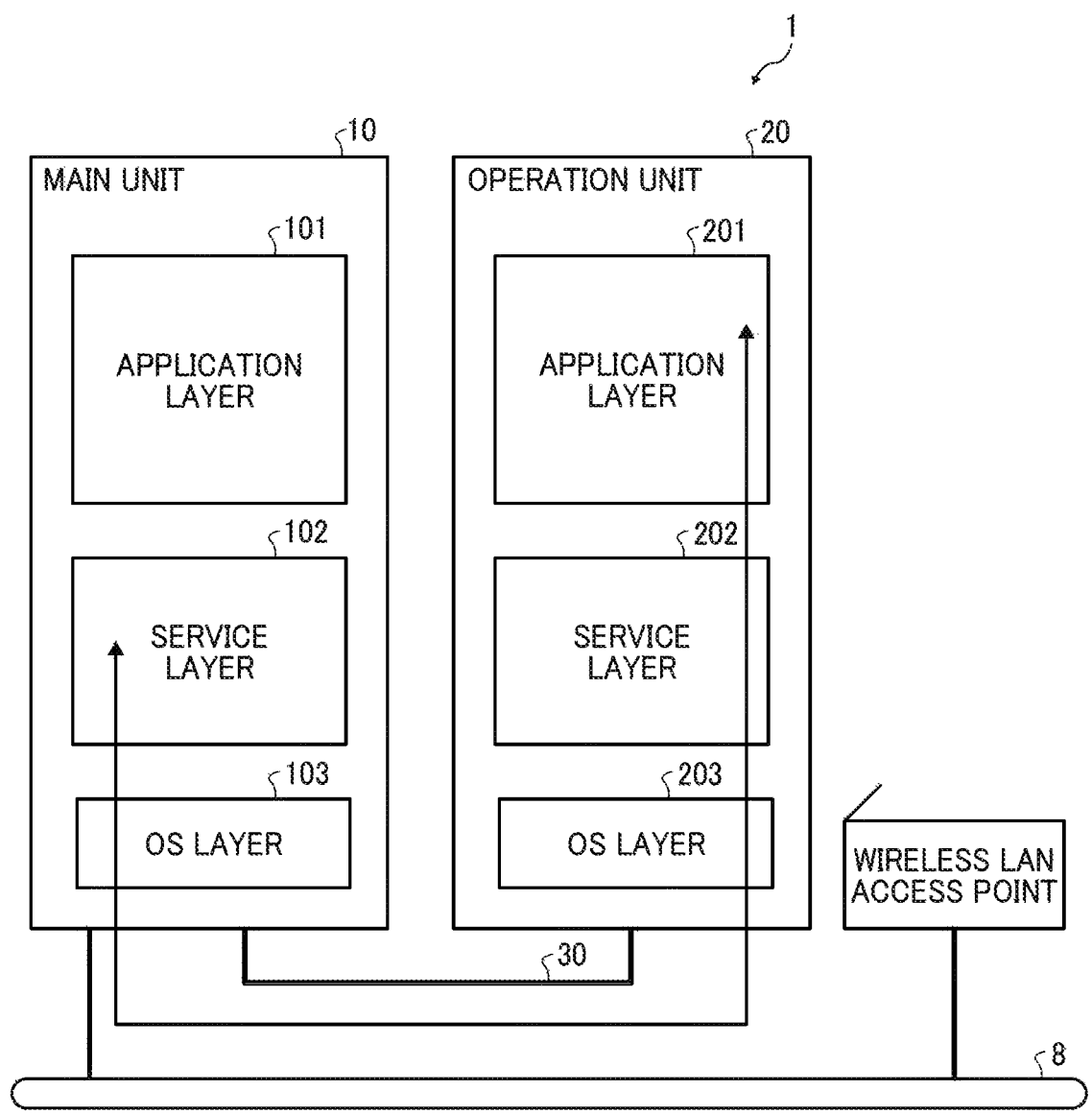
FIG. 4 illustrates an example of a software configuration of an image forming apparatus.

The communication I/F 25 is an interface used for connecting with the network 8. The connection I/F 26 is an interface for communicating with the main unit 10 via the communication path 30. The operation panel 27 receives various inputs in accordance with a user operation, and displays various information, such as information corresponding to the received operation, information indicating an operation status of the MFP 1, and a mode set for the MFP 1. In this example case, the operation panel 27 employs, for example, a liquid crystal display device (LCD) having a touch panel function, but not limited thereto. For example, the operation panel 27 can employ an organic electroluminescent (OEL) display having a touch panel function. In addition to or alternative to the display, the operation panel 27 can include an operation device (e.g., hardware key) and a display device (e.g., lamp unit). Hereinafter, a description is given of a software configuration of the MFP 1 with reference to FIG. 4. FIG. 4 schematically illustrates an example of a software configuration of the MFP 1. As illustrated in FIG. 4, the main unit 10 includes, for example, an application layer 101, a service layer 102, and an operating system (OS) layer 103. The application layer 101, the service layer 102, and the OS layer 103 correspond to various software stored in a memory such as the ROM 12 and the HDD 14. The CPU 11 executes these layers of software to provide various functions.

The software installed in the application layer 101 is application software (hereinafter, "application") that provides various functions by using one or more hardware resources. The application software can include, for example, a copy application for providing a copy function, a scanner application for providing a scanner function, a facsimile application for providing facsimile function, and a printer application for providing printer function.

The software installed in the service layer 102 interposes between the application layer 101 and the OS layer 103 to provide an interface for one or more applications to use the hardware resources disposed in the main unit 10. More specifically, the software installed in the service layer 102 provides a function of receiving an operation request for one or more hardware resources, and a function of adjusting or managing the operation request. The operation request, which is received by the service layer 102, can include, for example, a request for scanning using a scanner, and a request for printing using a plotter.

Further, the interface function by the service layer 102 is provided not only to the application layer 101 of the main unit 10, but also to an application layer 201 of the operation unit 20. That is, the application layer 201 (application) of the operation unit 20 can also implement one or more functions using one or more hardware resources (e.g., engine unit 17) of the main unit 10 through the interface function of the service layer 102. For example, the interface function of the service layer 102 is implemented by a Web application interface (API).

The software installed in the OS layer 103 is basic software, such as an operating system (OS) used for providing basic functions for controlling the hardware resources disposed in the main unit 10. The software installed in the service layer 102 converts one or more use requests of hardware resources from various applications into commands that can be interpreted by the OS layer 103, and transfers the commands to the OS layer 103. When the command is performed by the software installed in the OS layer 103, one or more relevant hardware resources perform an operation in accordance with a request of the application.

Similarly, as illustrated in FIG. 4, the operation unit 20 includes, for example, an application layer 201, a service layer 202, and an OS layer 203. The application slayer 201, the service layer 202, and the OS layer 203 disposed for the operation unit 20 have a hierarchical structure similar to the main unit 10. However, functions implemented by the application layer 201 and types of operational requests that the service layer 202 can receive differ from the main unit 10. The application installed in the application layer 201 can be software used for providing given functions by using one or more hardware resources disposed in the operation unit 20, in which the application installed in the application layer 201 can be software that provides a function of user interface (UI) used for performing receiving user operations and displaying information of operations performed by the main unit 10 such as copy function, scanner function, facsimile function, and printer function. In this example case, the application installed in the application layer 201 includes, for example, an application market application 20a, which provides a function to acquire an application list screen. Further, the software installed in the service layer 202 can be considered to, be a system software used for supporting operations and use of a computer, such as managing and controlling hardware resources of the computer. The software (system software) of the service layer 202 includes, for example, an installer for installing one or more applications and updating one or more firmware.

In the embodiment, to maintain independence of the functions of the main unit 10 and the operation unit 20, the software used for the OS layer 103 in the main unit 10 and the software used for the OS layer 203 in the operation unit 20 are different with each other. That is, the main unit 10 and the operation unit 20 operate independently of each other using different operating systems. For example, Linux (registered trademark) can be used as the software (i.e., first operating system) of the OS layer 103 in the main unit 10, and Android (registered trademark) can be used as the software (i.e., second operating system) of the OS layer 203 in the, operation unit 20, in which the first operating system and the second operating system use any operating systems different from each other.

As described above, since the main unit 10 and the operation unit 20 are operated using the mutually different operating systems in the MFP 1, communication between the main unit 10 and the operation unit 20 is performed as communication between different devices instead of communication within the same apparatus. An operation (i.e., command communication) to transmit the information received by the operation unit 20 (i.e., instruction by user) to the main unit 10, and an operation to notify an event from the main unit 10 to the operation unit 20 are examples of the communication between the main unit 10 and the operation unit 20. In this configuration, when the operation unit 20 performs a command communication to the main unit 10, the functions of the main unit 10 can be used. Further, the event notified to the operation unit 20 from the main unit 10 includes, for example, an execution status of an operation in the main unit 10, and contents set at the main unit 10.

Further, power is supplied to the operation unit 20 from the main unit 10 via the communication path 30, and the power supplied to the operation unit 20 can be controlled independently from the power supply to the main unit 10.

Figure 5:
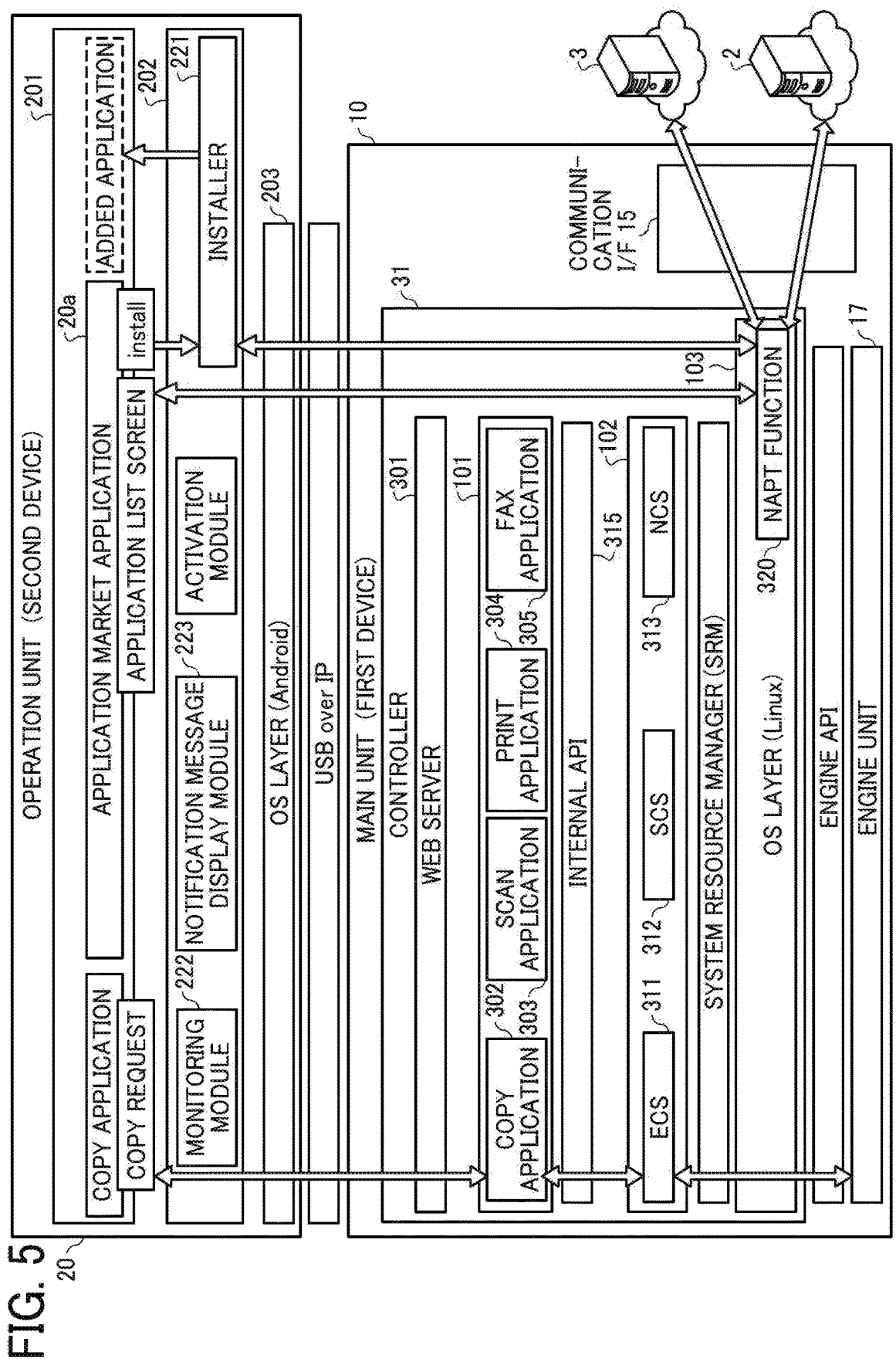
FIG. 5 illustrates an example of a software configuration of a main unit and an operation unit.

FIG. 5 illustrates an example of a software configuration of the main unit 10 and the operation unit 20. As illustrated in FIG. 5, the main unit 10 includes, for example, a controller 31 mounted with the CPU 11, and the engine unit 17. The controller 31 includes, for example, a Web API service 301 (e.g., Web server), applications installed in the application layer 101 (e.g., copy application 302, scan application 303, print application 304, facsimile (FAX) application 305), system software installed in the service layer 102 (e.g., engine control service (ECS) 311, system control service (SCS) 312, network control service (NCS) 313), and the OS layer 103. These functions are implemented when the CPU 11 executes various programs.

The Web API service 301 receives a request from the operation unit 20 and/or an external terminal, converts the request into information (request information) that can be interpreted by the application installed in the application layer 101, and distributes the request information to the corresponding application installed in the application layer 101. When the application installed in the application layer 101 receives the request information from the Web API service 301, the application causes the engine unit 17 to execute processing such as job processing via an internal API 315.

The ECS 311 is a service module used for managing and adjusting the engine unit 17. The SCS 312 is a service module used for performing an energy-saving control, to be described below, and managing jobs performed by the MFP 1. The NCS 313 is a service module used for performing communication control (e.g., network control).

For example, when the copy application 302 of the main unit 10 receives a copy request from the Web API service 301 based on a copy request from an application (copy application) of the operation unit 20, the copy application 302 causes the engine unit 17 to execute a copy job via the internal API 315 and the ECS 311.

In a case that the SCS 312 of the main unit 10 is used from the application installed in the operation unit 20, a communication module set between the operation unit 20 and the main unit 10 is used, in which the communication module serving as a bridge between the application installed in the operation unit 20 and the SCS 312 is included in the controller 31, while the API such as the Web API service 301 and internal API 315 is not used.

Figure 6:
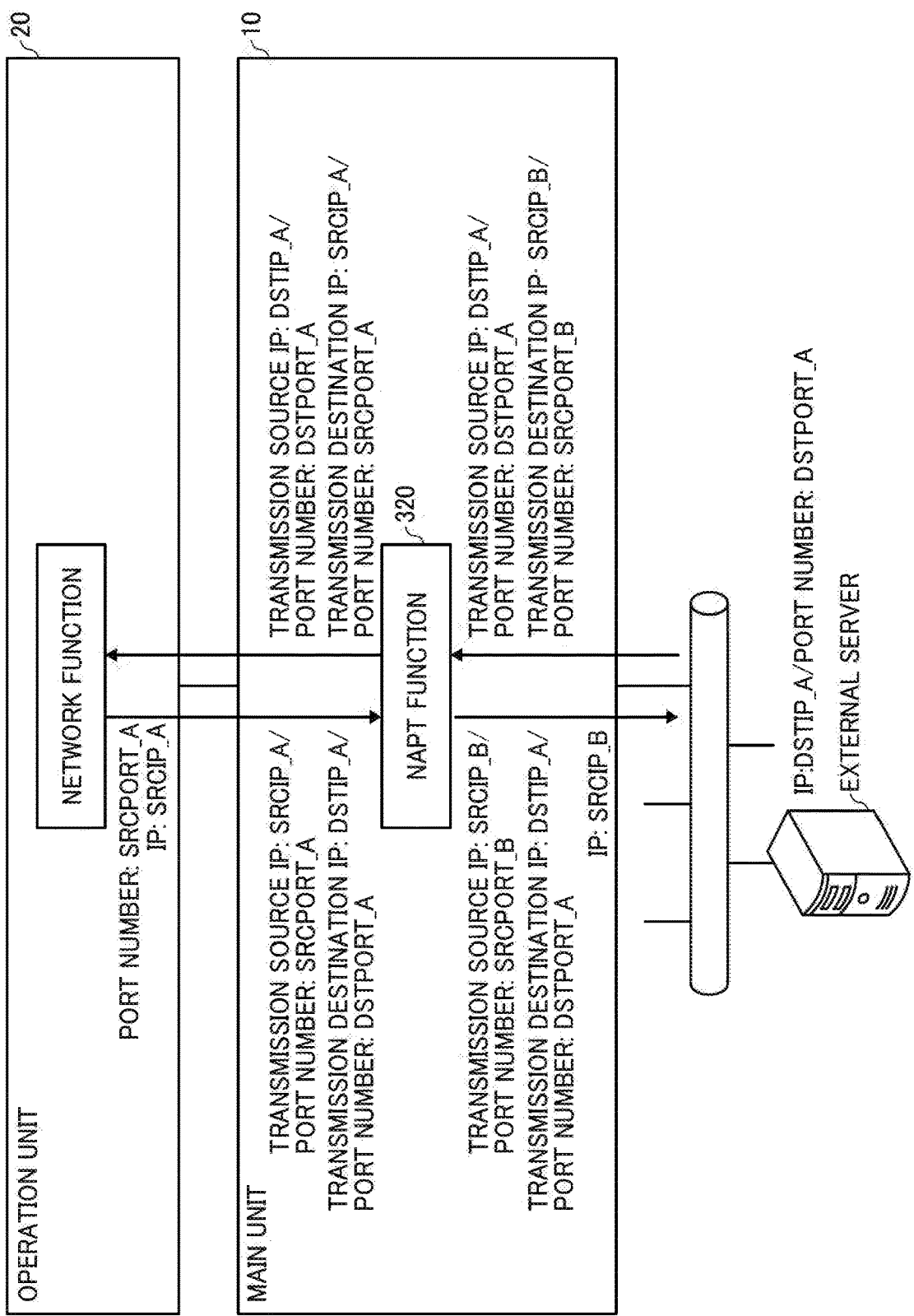
FIG. 6 illustrates an example of a communication method of an operation unit.

Further, the operation unit 20 can use the network 8 via a network address port translation (NAPT) function 320 included in the OS layer 103 of the main unit 10. For example, as illustrated in FIG. 6, it is assumed that a network function of the operation unit 20, which is implemented by executing a program such as an application and controlling the communication I/F 25 using the CPU 11, communicates with an external server via the main unit 10. In this example case, a port number of the operation unit 20 is "SRCPORT_A," and an IP address of the operation unit 20 is "SRCIP_A."

In this example case, it is assumed that the operation unit 20 transmits data to the external server. In this example case, a port number of the external server is set with "DSTPORT_A," and the IP address of the external server is set with "DSTIP_A." In this example case, the NAPT function 320 converts the port number and IP address of the transmission source or sender (i.e., operation unit 20) into a port number (SRCPORT_B) and an IP address (SRCIP_B) of the main unit 10, and then transmits the converted port number and IP address to the external server as the transmission source or sender. On the other hand, when the operation unit 20 receives data from the external server, the NAPT function 320 converts the port number and IP address of the data transmission destination (i.e., main unit 10) with respect to the external server into the port number (SRCPORT_A) and the IP address (SRCIP_A) of the operation unit 20. and then the NAPT function 320 transfers the data received from the external server to the operation unit 20.

In an example illustrated in FIG. 5, the application market application 20a of the operation unit 20 acquires the application list screen from the application market server 2 using the NAPT function 320 of the main unit 10. Then, when the install button 6 (FIG. 2) of any one of applications is pressed, an installer 221 of the operation unit 20 is activated, and then the installer 221 downloads the application from the application server 3 using the NAPT function 320, and installs the downloaded application. With this configuration, one or more applications can be added to the operation unit 20 at any time.

Figure 7:
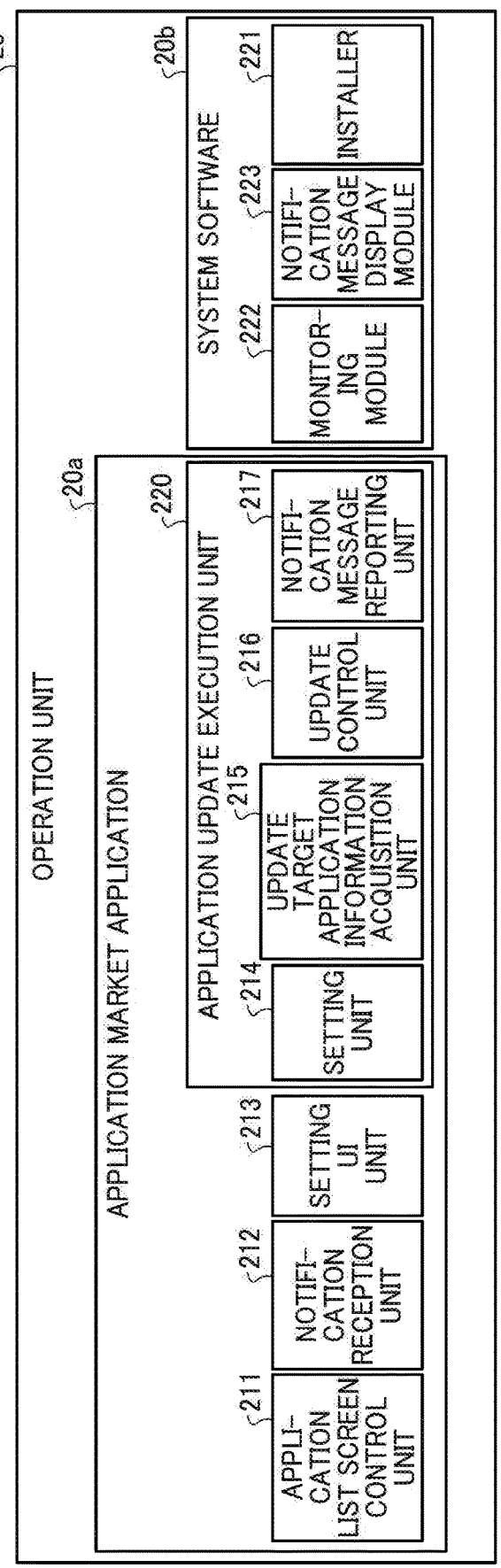
FIG. 7 illustrates an example of a functional block diagram of an operation unit of a first embodiment.

FIG. 7 illustrates an example of a functional block diagram of the operation unit 20. For the convenience of description, FIG. 7 illustrates the functions described for the embodiment, but the functions of the operation unit 20 are not limited thereto.

As illustrated in FIG. 7, the operation unit 20 includes, for example, an application market application 20a, and system software 20b. The application market application 20a provides various functions, such as an application list screen control unit 211, a notification reception unit 212, a setting UI unit 213, and an application update execution unit 220. In this example case, the application update execution unit 220 includes, for example, a setting unit 214, an update target application information acquisition unit 215, an update control unit 216, and a notification message reporting unit 217, and the application update execution unit 220 is implemented as a thread of the application market application 20a. These functions are implemented when the CPU 21 of the operation unit 20 executes the application market application 20a. Further, the system software 20b provides various functions, such as an installer 221, a monitoring module 222, and a notification message display module 223. These functions are implemented when the CPU 21 of the operation unit 20 executes the system software 20b.

The application list screen control unit 211 acquires the application list screen from the application market server 2, and controls displaying of the application list screen on the operation panel 27. As described above with reference to FIG. 5, the application list screen control unit 211 communicates with the application market server 2 via the NAPT function 320 of the main unit 10. In one embodiment, when a user touches an icon 5 used for activating the application market application on an operation screen illustrated in FIG. 8 that receives various operations, the application market application is activated. Then, the application list screen control unit 211 transmits a signal (hereinafter, "display request") requesting the application list screen to the application market server 2. Then, the application list screen control unit 211 acquires the application list screen (FIG. 2) from the application market server 2 as a response, and displays the acquired application list on the operation panel 27. In this example case, a uniform resource locator (URL) scheme describing a procedure for executing an installation command is set with the install button 6.

Figures 8, 9:
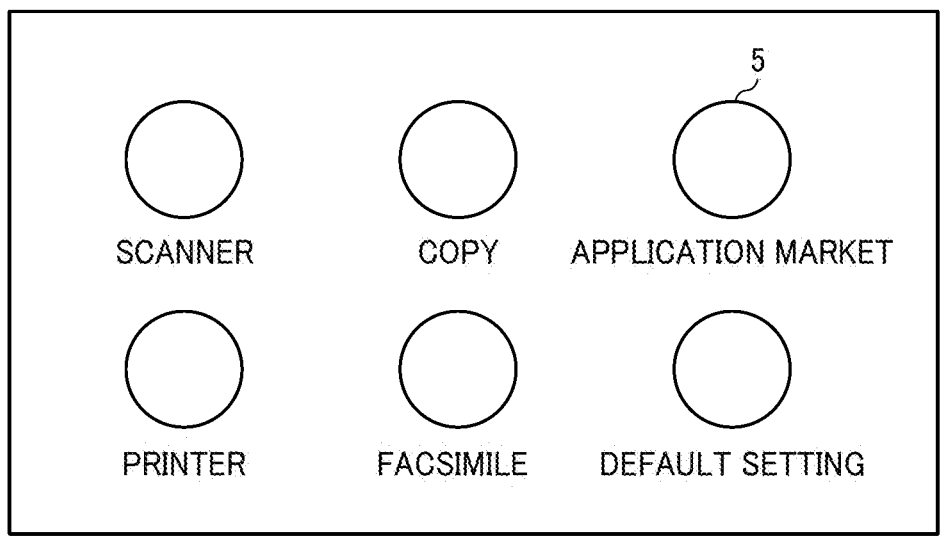
FIG. 8 illustrates an example of an operation screen.
FIG. 9 illustrates an example of a URL scheme.

FIG. 9 illustrates an example of URL, scheme set with the install button 6 associated with one application identified by an ID (i.e., application ID) of "49354." In an example of FIG. 9, "installer" is a header portion of the URI scheme, and the header portion of the URL scheme can be referred to as a "scheme portion" in the following description. The "installer" used as the scheme portion indicates information identifying an application that performs the installation command, and in this example case, the scheme portion indicates an installer mounted on the MFP 1. Further, in FIG. 9, "installApp" of "installApp?id=49354" is an installation command or instruction, and the argument of the installation command is "id=49354." In this case, "installApp" indicates the installation command for the application identified by the ID of "49354." That is, "installApp" indicates a specific content of the installation command. In FIG. 9, the URL scheme indicates information describing the execution procedure of the installation command in the URI, format, and when the install button 6 set with the URL scheme is pressed, the installer 221 is activated, and then the activated installer 221 performs the command for installing the application identified by the ID of "49354." Specifically, the installer 221 requests downloading of the application to the application server 3, and then downloads the application from the application server 3. Then, the installer 221 installs the downloaded application in the MFP 1. As described above, the installer 221 communicates with the application server 3 via the NAPT function 320 of the main unit 10.

Returning to FIG. 7, the description is further continued. The notification reception unit 212 receives a notification from the monitoring module 222 to be described below. The notification reception unit 212 functions as a receiver.

Figure 11:
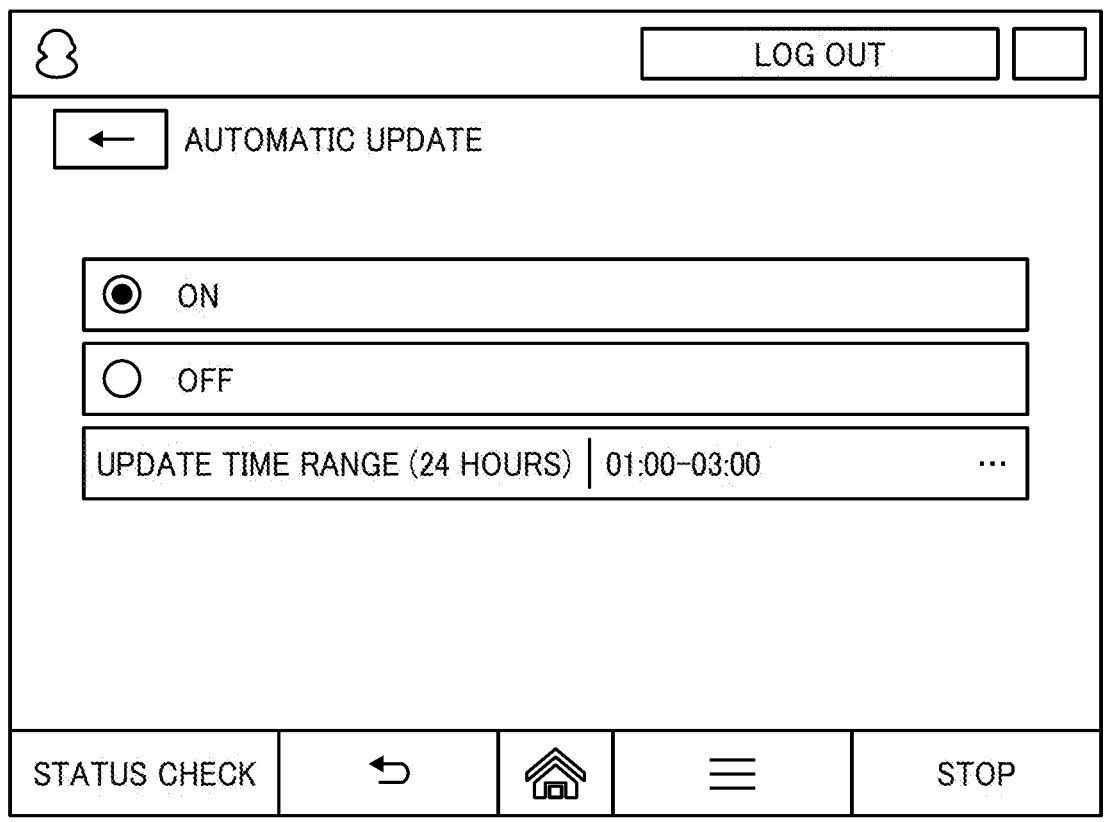
FIG. 11 illustrates an example of a screen for setting an automatic update.
Figure 12:
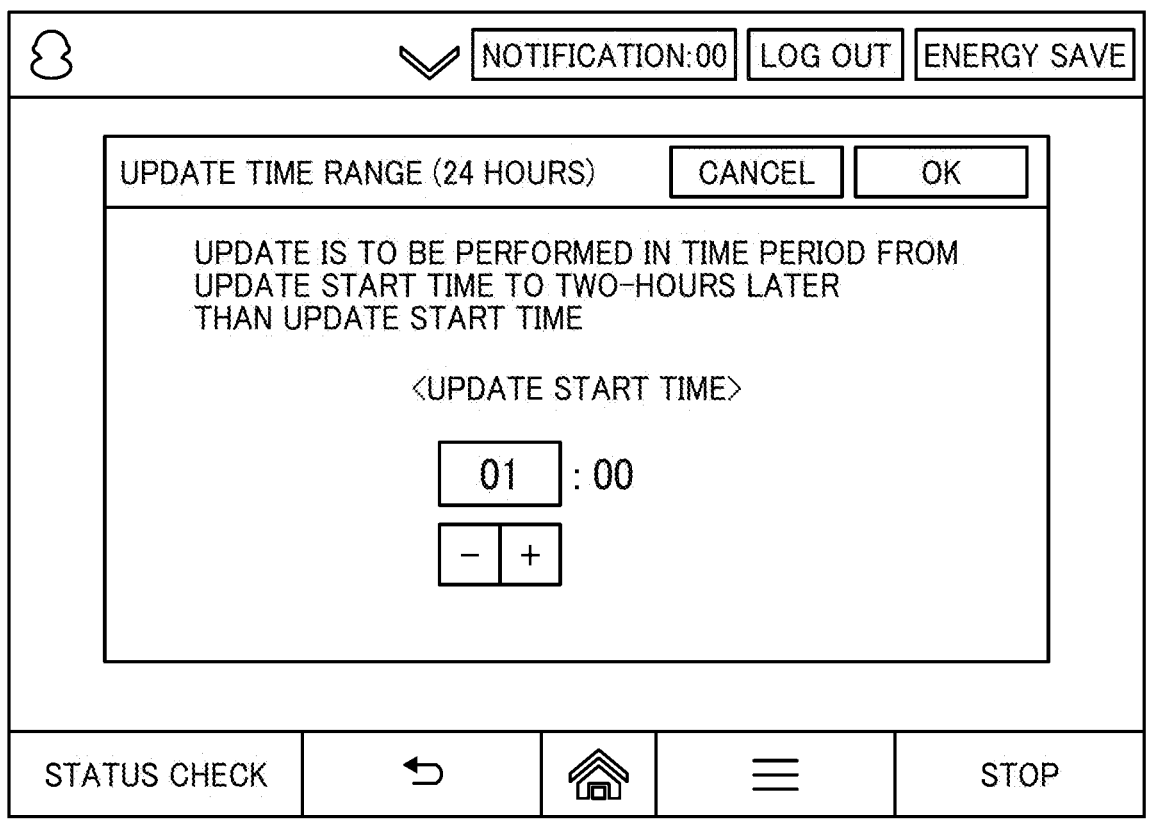
FIG. 12 illustrates an example of a screen for setting an update time range.

The setting UI unit 213 displays one or more screens on the operation panel 27, which are used for inputting settings. For example, the setting UI unit 213 displays a management menu screen, illustrated in FIG. 10, on the operation panel 27. When an "automatic update" button on the management menu screen is pressed, the setting UI unit 213 displays an automatic update setting screen, illustrated in FIG. 11, on the operation panel 27. In this example case, when the setting UI unit 213 receives a selection of "ON," which enables setting of automatic updating of the installed application, from the automatic update setting screen, the setting of automatic updating is enabled. On the other hand, when the setting UI unit 213 receives a selection of "OFF," which disables the automatic updating, from the automatic update setting screen, the automatic update setting becomes invalid. Further, when the setting UI unit 213 receives a selection of an "update time range" button from the automatic update setting screen (i.e., when the "update time range" button is pressed), the setting UI unit 213 displays a screen for setting an update time range (see FIG. 12) on the operation panel 27, with which a user can set the update time range. Based on the set update time range, the operation unit 20 automatically selects a time within the update time range discretionarily or randomly to set the selected time as the update time for performing the update of application as described below.

As illustrated in FIG. 7, the application update execution unit 220 includes the setting unit 214, the update target application information acquisition unit 215, the update control unit 216, and the notification message reporting unit 217. The setting unit 214 performs various settings (including control for setting) in accordance with an input received via a screen displayed by the setting UI unit 213. The setting unit 214 sets the update time indicating a time for performing the update of an application, such as an automatic updating of the application, based on the update time range set by the user (see FIG. 30). In an example case of FIGS. 11 and 12, the setting unit 214 receives, for example, information of an update time range (period) of two hours starting from a given update start time that is set or designated by a user, and stores the update time range in the storage unit (e.g., flash memory 24) of the operation unit 20 (see S101 of FIG. 30), in which the user can set any time range as the update time range.

With this configuration, the update time range can be set in advance. The setting unit 214 is configured to automatically select a time within the update time range discretionarily or randomly, to set the selected time as the update time for performing the update of application. In this example, the setting unit 214 of each of the MFPs 1, 1A, and 1X automatically selects and sets the update time within the update time range discretionarily or randomly, for example, using a step of 15 minutes (e.g., 1:10, 1:25, 1:50, 2:05, 2:20). With this configuration, the update time can be automatically and randomly set for each of the MFPs 1, 1A, and 1X separately.

Further, if a first update time set by one MFP (e.g., MFP 1) and a second update time set by another MFP (e.g., MFP 1A) are the same update time, and the server, such as the application market server 2 or the application server 3, receives requests for downloading applications from the different MFPs for that same update time, the server adjusts the first and second update times to be different from one another. In other words, the server sets the update times of each of the plurality of MFPs so that the corresponding update times of each of the plurality of MFPs are different.

Further, the server, such as the application market server 2 or the application server 3 can be configured to set the update time within the update time range for each of the MFPs 1, 1A, and 1X, based on identification information of each MFP, such as a serial number, depending on the system design configuration, if preferable.

Figure 10:
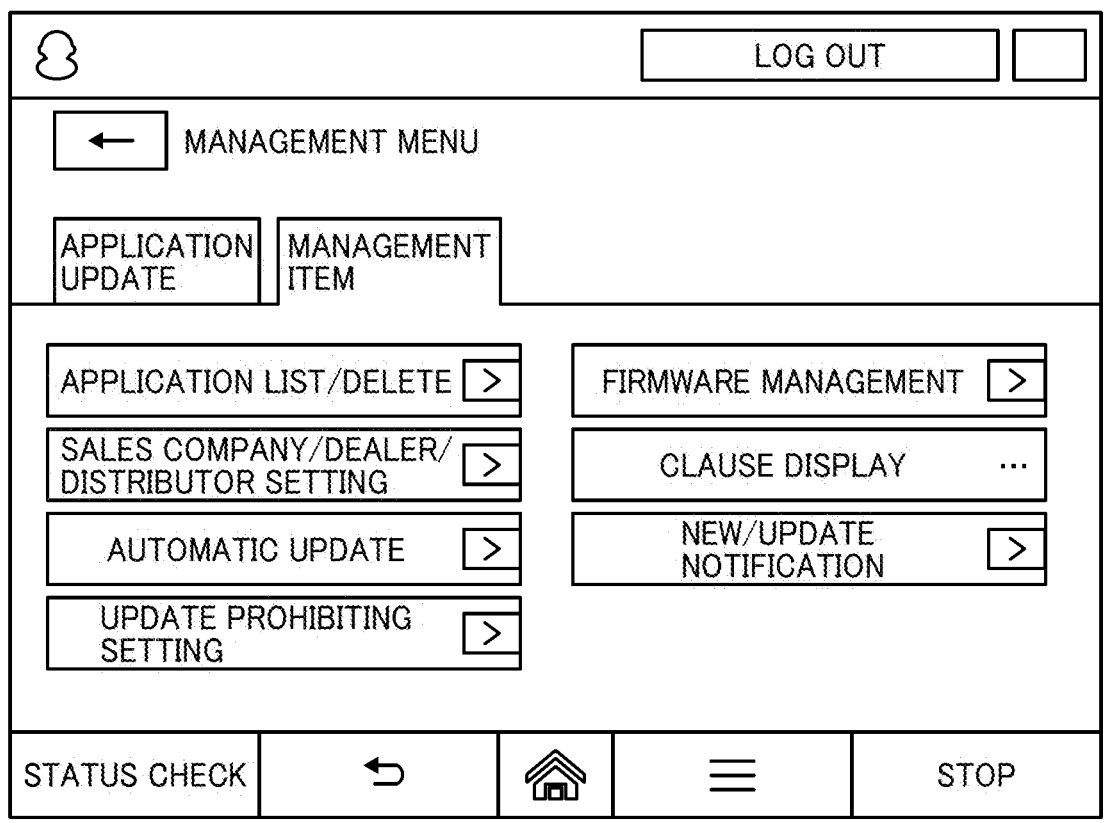
FIG. 10 illustrates an example of a management menu screen.
Figure 13:
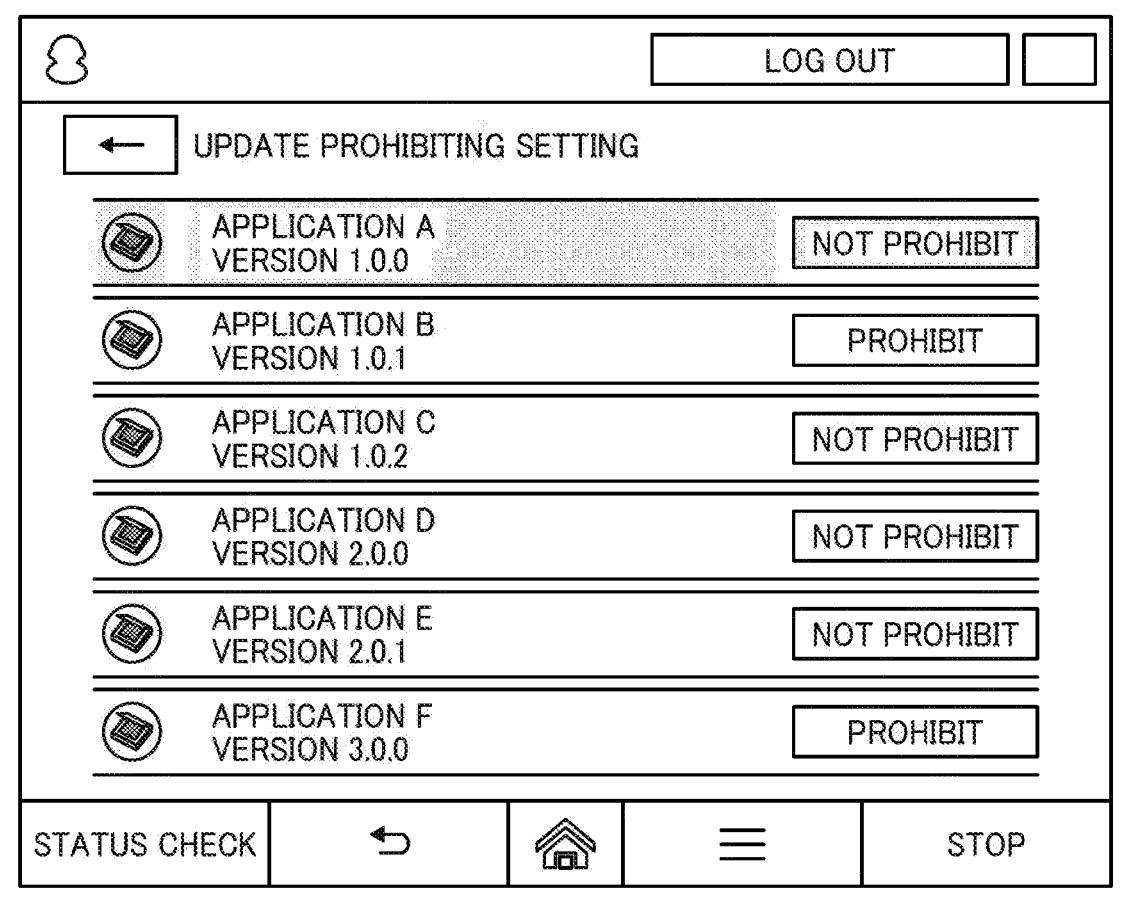

In this example case, when an "update prohibiting setting" button on the management menu screen illustrated in FIG. 10 is pressed, the setting unit 214 displays an update prohibiting setting screen illustrated in FIG. 13 on the operation panel 27. A user can determine whether the automatic updating is allowed or prohibited for each application, and selects "prohibit" for an application that the user wants to prohibit the automatic updating. When the setting unit 214 receives the "prohibit" selection for one application, the setting unit 214 removes the one application from the target of the automatic updating.

Returning to FIG. 7, the description is further continued. The setting unit 214 notifies the update time, set as described above, to the monitoring module 222. The monitoring module 222, which is an example of a monitoring unit, monitors whether the current time is equal to the update time set by the setting unit 214, or the update time notified by the setting unit 214. When the current time is equal to the update time, the monitoring module 222 notifies that the current time is equal to the update time to the application market application 20*a* (notification reception unit 212). In this example case, when the MFP 1 is activated, the monitoring module 222 notifies an activation notification indicating that the MFP 1 is activated to the application market application 20*a* (notification reception unit 212). In this example case, if the operation unit 20 does not receive a user operation for a given period of time or more after activating the MFP 1, the monitoring module 222 shifts a mode of the operation unit 20 to an energy saving mode (e.g., sleep mode), in which the power consumption is smaller than a normal mode when the operation unit 20 displays the screen and can receive the user operation. For example, the monitoring module 222 can stop the operation of the CPU 21 during the energy saving mode.

The update target application information acquisition unit 215 acquires the update target application information indicating one or more applications that need to be updated among one or more applications installed in, the MFP 1 (operation unit 20) from the application market server 2, which is an example of an external server. In one embodiment, when the current time is equal to the update time indicating the timing to perform the updating, the update target application information acquisition unit 215 transmits an acquisition request for requesting the update target application information to the application market server 2, and then acquires the update target application information from the application market server 2. The acquisition request includes, for example, information indicating a product ID, a version, and an application name identifying the concerned application for each of one or more applications installed in the MFP 1. In this example case, the acquisition request includes an information group composed of the product ID, version, and application name for the concerned application, and the number of info illation groups can be the same as the number of the applications installed in the MFP 1.

In this example case, when the notification reception unit 212 receives a notification that the current time is equal to the update time from the monitoring module 222, the update target application information acquisition unit 215 transmits the above described acquisition request to the application market server 2, and acquires the update target application information from the application market server 2 as a response. The update target application information acquisition unit 215 communicates with the application market server 2 via the NAPT function 320 of the main unit 10. In this example case, the update target application information includes, for example, the product ID identifying the concerned application, and the latest version and the application name of the concerned application for each of the one or more applications that need to be updated. Further, if an application that needs to be updated (e.g., for which an update is available) does not exists, information indicating that the application that needs to be updated does not exist is notified as a response to the acquisition request, which can be referred to "update unnecessary information" in the following description. When the update target application information acquisition unit 215 acquires the update target application information from the application market server 2, the update target application information acquiring unit 105 stores information indicating the number of applications that need to be updated in the HDD 14 of the main unit 10 as cache data. Further, instead of storing the information indicating the number of applications that need to be updated, for example, the update target application information can be stored as cache data. That is, the cache data can be any information related to the application that needs to be updated, and the contents of cache data can be set variably.

On the other hand, when the update target application information acquisition unit 215 acquires the update unnecessary information from the application market server 2, the update target application information acquisition unit 215 clears the cache data in the HDD 14. The details are described below.

The update control unit 216 performs controlling of updating the application indicated by the update target application information acquired by the update target application information acquisition unit 215. In this example case, the update control unit 216 transmits an update request for requesting updating of one or more applications indicated by the update target application information to the installer 221. In this example case, the update request includes, for example, the information group composed of the product ID, version, and application name set for each application that needs to be updated.

The installer 221, which has received the update request from the update control unit 216, updates one or more applications that need to be updated. In this configuration, a combination of the update control unit 216 and the installer 221 can correspond to a functional unit (i.e., update control unit) used for updating one or more applications indicated by the update target application information acquired by the update target application information acquisition unit 215, or any one of the update control unit 216 and the installer 221 can correspond to a functional unit (i.e., update control unit) used for updating one or more applications. Further, the installer 221 is an example of a "firmware update control unit," which updates the firmware when the firmware is required to be updated to use the application indicated by the update target application information.

Figure 14:
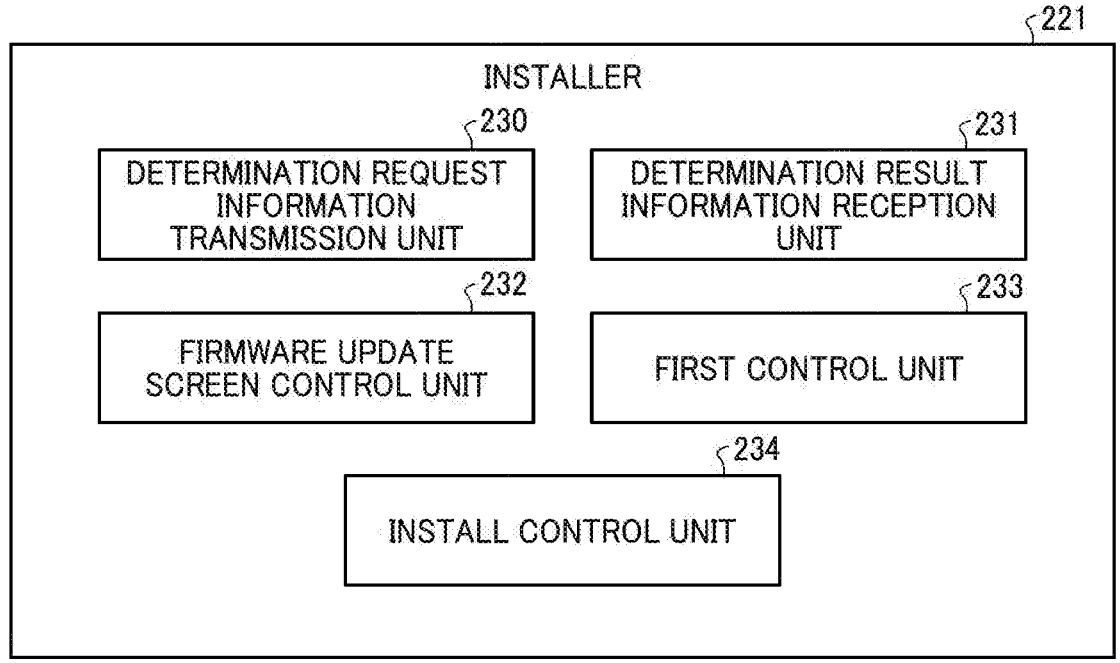
FIG. 14 illustrates an example of a functional block diagram of an installer.

Hereinafter, a description is given of automatic updating of the firmware. FIG. 14 illustrates an example of a functional block diagram of the installer 221. As illustrated in FIG. 14, the installer 221 includes, for example, a determination request information transmission unit 230, a determination result information reception unit 231, a firmware update screen control unit 232, a first control unit 233, and an install control unit 234. For the convenience of description, FIG. 14 illustrates the functions described for the embodiment, but the functions of the installer 221 are not limited thereto. Further, as described above, the installer 221 communicates with the application server 3 via the NAPT function 320 of the main unit 10.

The determination request information transmission unit 230 transmits determination request information requesting version validity determination processing to the application server 3, in which the version validity determination processing determines whether the application that needs to be updated can be used in the MFP 1. The determination request information includes, for example, a product ID identifying an application included in the update request, module identification (ID) information identifying a module for providing a function necessary for using the application, and version information indicating a version value of the module mounted on the MFP 1. The module indicates a unit of software used for providing a specific function. Further, the version value indicates an attribute of the corresponding module, and the version value becomes a greater value each time the module is changed.

In one embodiment, the determination request information includes, for example, one or more product IDs included in the update request. Further, the determination request information includes, for example, module information associating each one of a plurality of module IDs (i.e., module identification information) corresponding on a one-to-one basis with a plurality of modules mounted on the MFP 1, and version information indicating the version value of the module identified by the module ID. However, the determination request information is not limited thereto. For example, the determination request information can include a product ID included in the update request, a module ID identifying a module for providing a function necessary for using the application identified by the product ID, version information indicating a version value of a module installed in the MFP 1 that is identified by the module ID, and further, the determination request information can be configured not to include a module ID identifying a module that is not required for using the concerned application identified by the product ID, and version information indicating a version value of the module that is not required for using the concerned application.

The determination result information reception unit 231 receives determination result information indicating a result of the above described version validity determination processing as a response to the determination request information transmitted to the application server 3, from the application server 3. The specific configuration of the application server 3 is to be described later.

Figure 15:
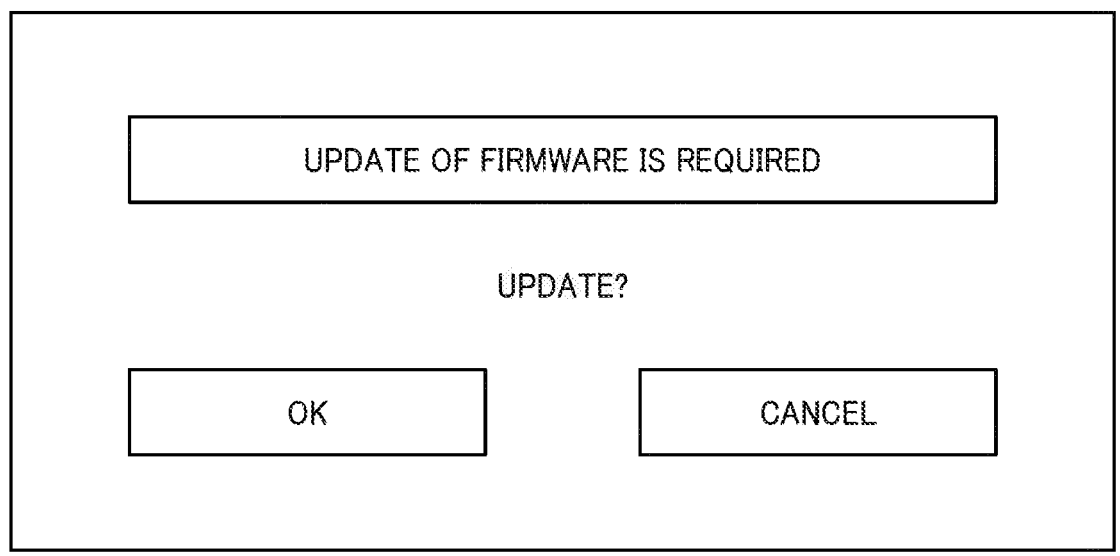
FIG. 15 illustrates an example of a firmware update screen.

If the determination result information received by the determination result information reception unit 231 indicates that the concerned application (i.e., an application identified by the product ID included in the update request) that needs to be updated cannot be used in the MFP 1, the firmware update screen control unit 232 displays a firmware update screen, which is used for receiving an instruction of whether to update the firmware or not. In one embodiment, the firmware update screen control unit 232 displays the firmware update screen illustrated in FIG. 15 on the operation panel 27. In this example case, a user can instruct the updating of firmware by pressing an "OK" button illustrated in FIG. 15.

The description of FIG. 14 is further continued. If the determination result information received by the determination result information reception unit 231 indicates that the concerned application that needs to be updated cannot be used in the MFP 1, the first control unit 233 updates the firmware used for controlling the operation of the MFP 1. In this example case, when the first control unit 233 receives an instruction of updating the firmware via the firmware update screen, the first control unit 233 controls the updating of the firmware.

Figure 16:
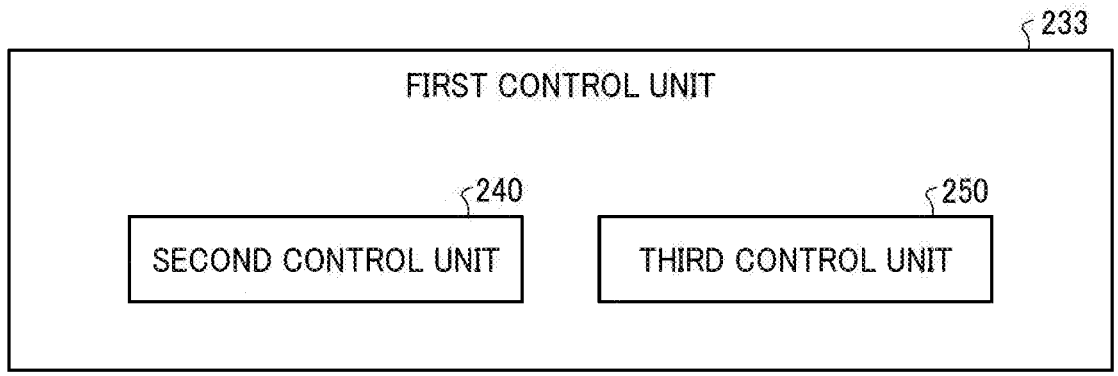
FIG. 16 illustrates an example of a functional block diagram of a first control unit.

In one embodiment, if the deter urination result information received by the determination result information reception unit 231 indicates that the concerned application that needs to be updated cannot be used in the MFP, the first control unit 233 installs or introduces a first firmware corresponding to the latest version firmware in the MFP 1. In this configuration, the first firmware includes a second firmware and a third firmware, in which the second firmware corresponds to the latest version firmware used for controlling the operation of the operation unit 20, and the third firmware corresponds to the latest version firmware used for controlling the operation of the main unit 10. Further, as illustrated in FIG. 16, the first control unit 233 includes, for example, a second control unit 240 and a third control unit 250. The second control unit 240 controls the installing (introducing) of the second firmware into the operation unit 20. The third control unit 250 controls the installing (introducing) of the third firmware into the main unit 10.

Figure 17:
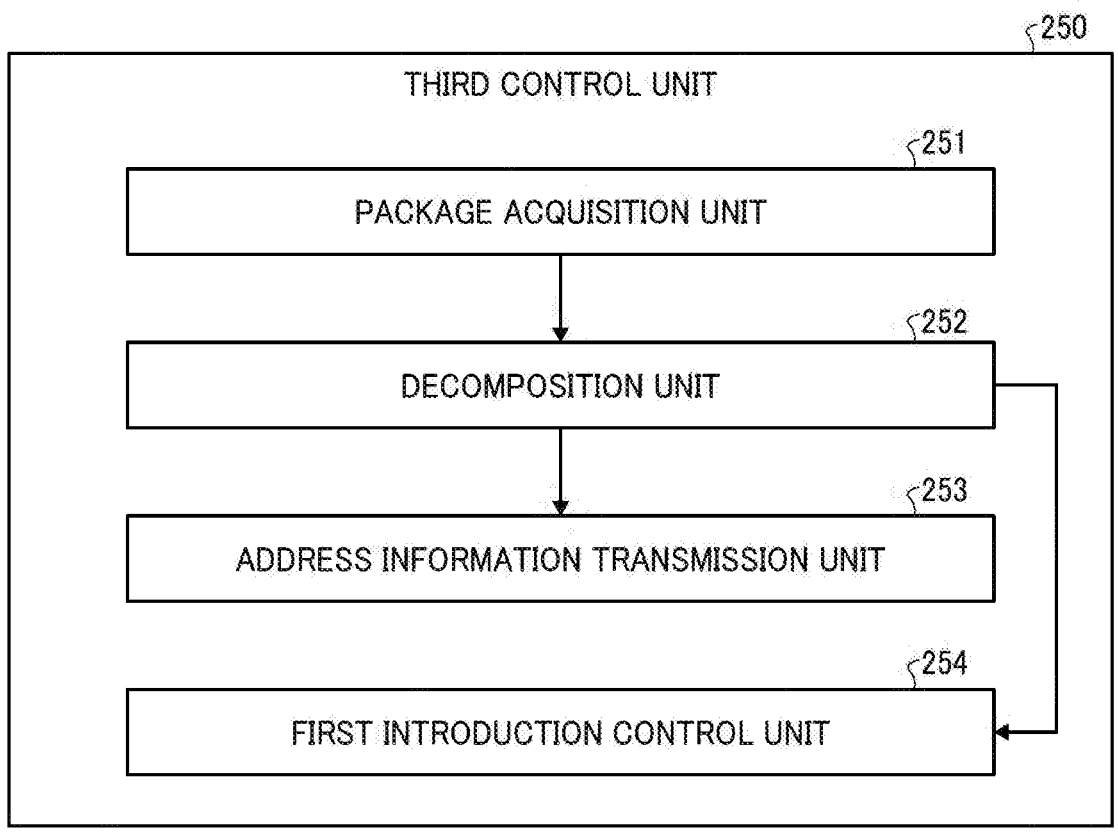
FIG. 17 illustrates an example of a functional block diagram of a third control unit.

For the convenience of description, a functional configuration of the third control unit 250 is described before a functional configuration of the second control unit 240. FIG. 17 illustrates an example of a functional block diagram of the third control unit 250. As illustrated in FIG. 17, the third control unit 250 includes, for example, a package acquisition unit 251, a decomposition unit 252, an address information transmission unit 253, and a first introduction control unit 254.

The package acquisition unit 251 acquires a package integrating the second firmware and the third firmware (i.e., package integrating the latest version firmware for the operation unit and the latest version firmware for the main unit. which can be referred to as the latest package), and stores the acquired package in the storage unit, such as the HDD 14. In the embodiment, the package acquisition unit 251 transmits a package request requesting the latest package to the firmware providing server 4 in accordance with an instruction from the instruction unit 241, to be described later, and acquires the latest version package from the firmware providing server 4 as a response to the package request.

The decomposition unit 252 decomposes the latest version package acquired by the package acquisition unit 251 into the second firmware and the third firmware. The package can be decomposed using various known methods.

The address information transmission unit 253 transmits address information (i.e., information indicating a location of the second firmware in the HDD 14) used for identifying an area (i.e., storage area) where the second firmware is stored in the storage unit, such as the HDD 14, to the second control unit 240.

The first introduction control unit 254 controls installing or introducing of the third firmware, decomposed by the decomposition unit 252, into the main unit 10. In this example case, the first introduction control unit 254 controls the installing of the third firmware into the main unit 10. More specifically, files such as programs and data that define the third firmware are loaded to set necessary settings, and then files that cannot be modified during the activation of OS are set by re-activating or rebooting the main unit 10.

Figure 18:
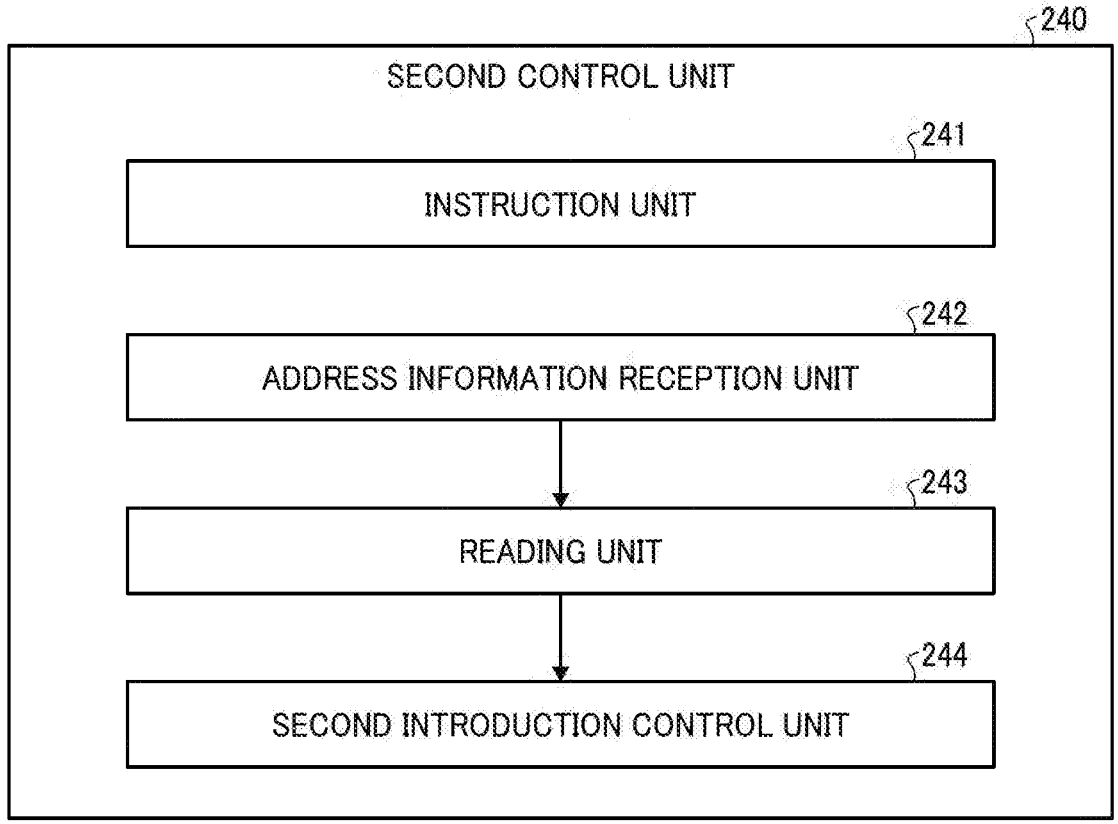
FIG. 18 illustrates an example of a functional block diagram of a second control unit.

Hereinafter, a description is given of a functional configuration of the second control unit 240. FIG. 18 illustrates an example of a functional block diagram of the second control unit 240. As illustrated in FIG. 18, the second control unit 240 includes, for example, an instruction unit 241, an address information reception unit 242, a reading unit 243, and a second introduction control unit 244.

When the determination result information received by the determination result information reception unit 231 indicates that the concerned application that needs to be updated cannot be used in the MFP 1, the instruction unit 241 instructs the third control unit 250 (package acquisition unit 251) to acquire the latest version package.

The address information reception unit 242 receives the address information from the third control unit 250. The reading unit 243 reads out the second firmware from the area in the storage unit (e.g., HDD 14) identified by the address information that is received by the address information reception unit 242.

The second introduction control unit 244 controls the installing of the second firmware, read by the reading unit 243, into the operation unit 20. In this example case, the second introduction control unit 244 controls the installing of the second firmware into the operation unit 20. More specifically, files such as programs and data that define the second firmware are loaded to set necessary settings, and then files that cannot be modified during the activation of OS are set by re-activating or rebooting the operation unit 20.

In the embodiment, the operation unit 20 includes, for example, the second control unit 240, and the main unit 10 includes, for example, the third control unit 250.

As above described, when the determination result information received by the determination result information reception unit 231 indicates that the concerned application that needs to be updated cannot be used in the MFP 1, the first control unit 233 installs the first firmware corresponding to the latest version firmware into the MFP 1. After the first control unit 233 performs the installation control, the determination request information transmission unit 230 re-transmits the determination request information to the application server 3, and repeats the above processing.

Figure 19:
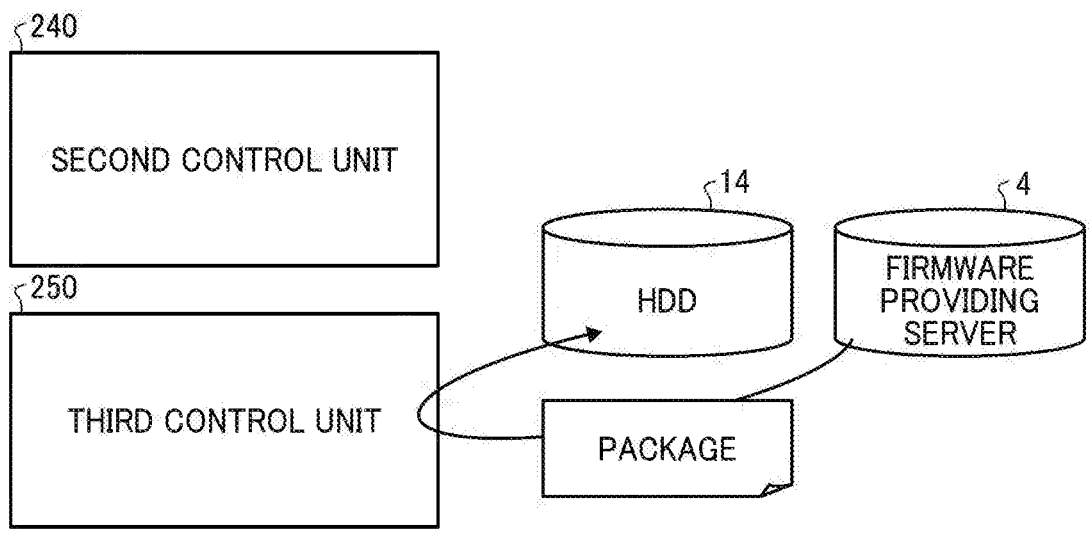
FIG. 19 illustrates a scheme of updating firmware.

Hereinafter, a description is given of a procedure of updating the firmware with reference to FIGS. 19 to 23. First, as illustrated in FIG. 19, the third control unit 250 (package acquisition unit 251) acquires the latest version package from the firmware providing server 4 in accordance with an instruction from the second control unit 240 (instruction unit 241), and stores the acquired package in the HDD 14.

Figure 20:
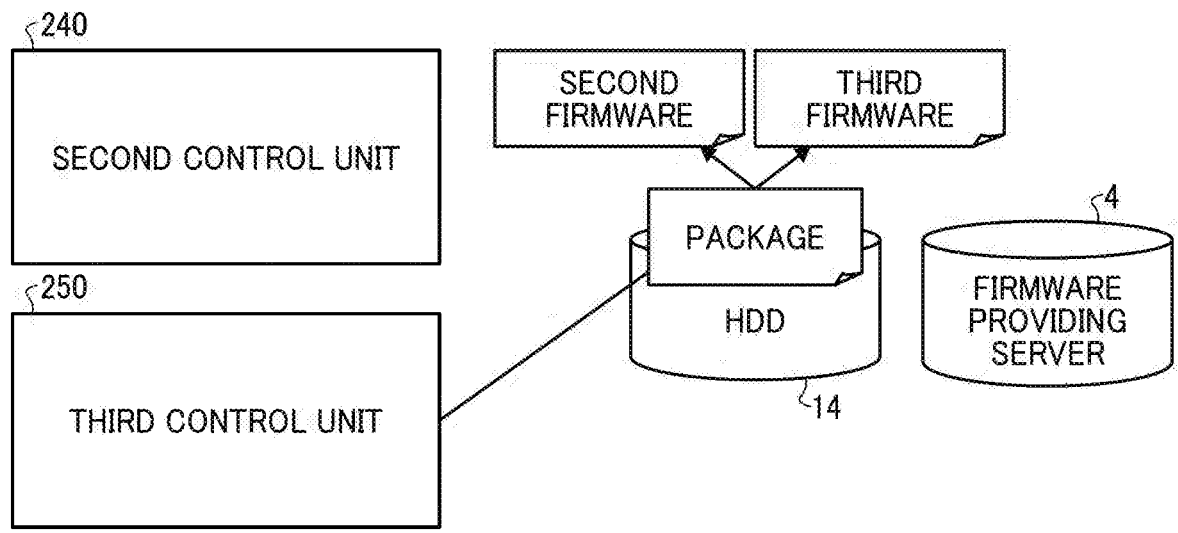
FIG. 20 illustrates a scheme of updating firmware continued from FIG. 19.

Then, as illustrated in FIG. 20, the third control unit 250 (decomposition unit 252) decomposes the package stored in the HDD 14 into the second firmware and the third firmware.

Figure 21:
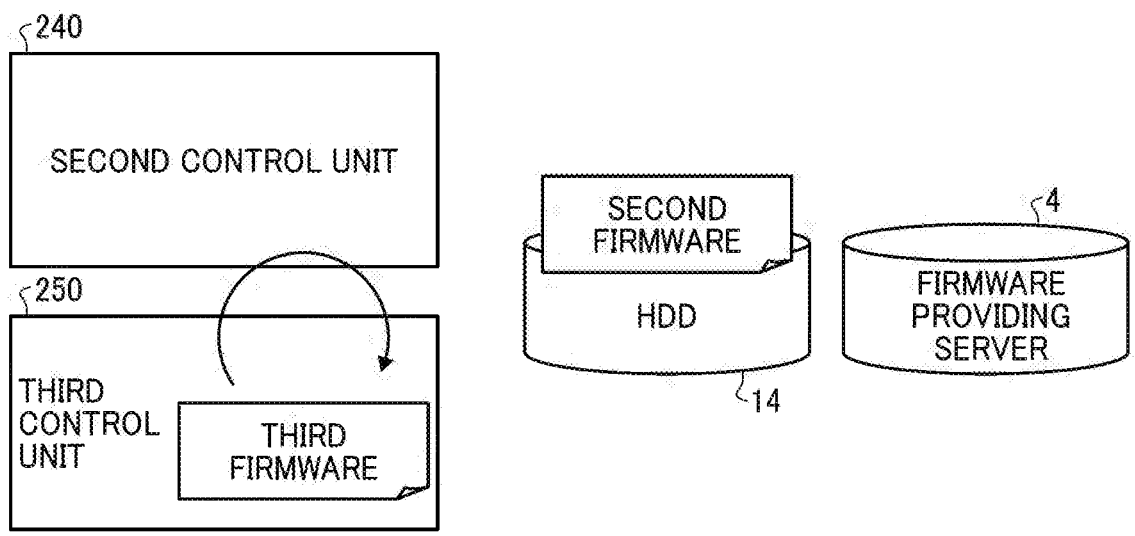
FIG. 21 illustrates a scheme of updating firmware continued from FIG. 20.

Then, as illustrated in FIG. 21, the third control unit 250 (first introduction control unit 254) loads one or more files such as one or more programs and data defining the third firmware to set necessary settings. At this stage, the main unit 10 is not re-activated.

Figure 22:
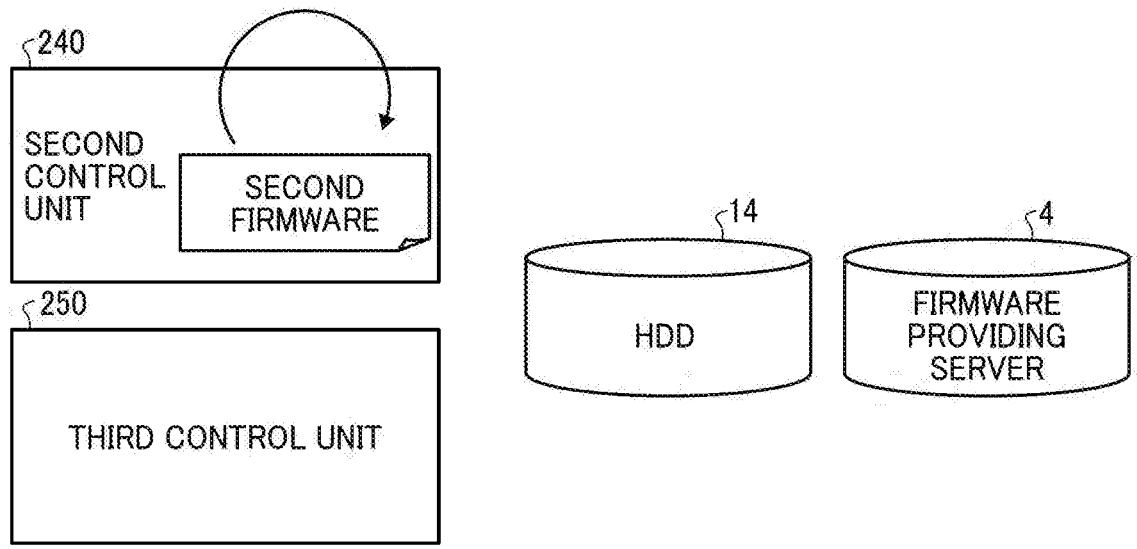
FIG. 22 illustrates a scheme of updating firmware continued from FIG. 21.

Then, the third control unit 250 instructs the second control unit 240 to introduce the second firmware (i.e., instruction to update the firmware of the operation unit 20). In this example case, the third control unit 230 (address information transmission unit 253) transmits address information identifying an area where the second firmware is stored in the HDD 14, to the second control unit 240, in which the third control unit 250 instructs the introduction of the second firmware to the second control unit 240. Then, the second control unit 240 (reading unit 243) reads out the second firmware from the area in the HDD 14 identified by the address information received from the third control unit 250. Then, as illustrated in FIG. 22, the second control unit 240 (second introduction control unit 244) loads one or more files such as one or more programs and data defining the second firmware to set necessary settings. Then, after completing the settings of the files, which are other than files that cannot be modified during the activation of OS, the operation unit 20 is re-activated, and then the second control unit 240 sets one or more files that cannot be modified during the activation of OS. This completes the introduction of the second firmware to in the operation unit 20.

Figure 23:
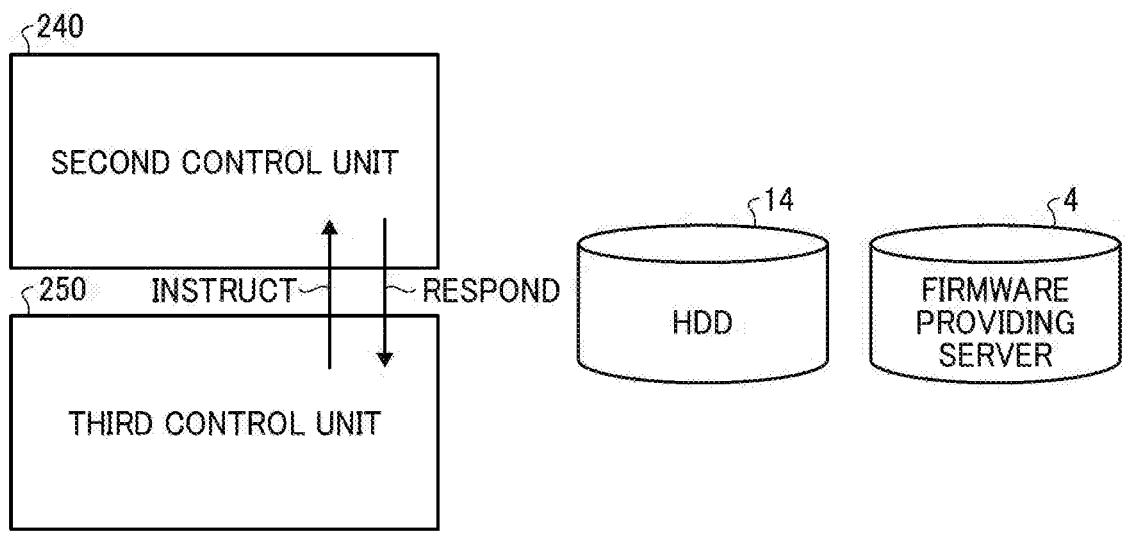
FIG. 23 illustrates a scheme of updating firmware continued from FIG. 22.

After the re-activation of the operation unit 20 is completed, and then the operation unit 20 and the main unit 10 are reconnected, the third control unit 250 instructs the second control unit 240 to introduce the second firmware again as illustrated in FIG. 23. At this stage, since the introduction of the second firmware into the operation unit 20 has been completed, the second control unit 240, receiving this instruction, immediately returns a response indicating that the introduction of the second firmware has been completed to the third control unit 250. After receiving this response from the second control unit 240, the third control unit 250 (first introduction control unit 254) re-activates the main unit 10, and sets one or more files that cannot be modified during the activation of OS. This completes the introduction of the third firmware to the main unit 10.

After completing the introduction of the first firmware to the MFP 1 as above described, the MFP 1 requests the application server 3 to perform the above described version validity determination processing again. In other words, after completing the introduction of the first firmware into the MFP 1, the determination request information transmission unit 230 transmits the determination request information to the application server 3 again. In this case, the module information included in the determination request information is the latest module information, while the product ID is same as the most-recent determination request information. Similar to the above, the application server 3 that has received this determination request information performs the above-described version validity determination processing, and transmits the determination result information indicating a determination result to the MFP 1.

The description of FIG. 14 is further continued. When the determination result information received by the determination result information reception unit 231 indicates that the concerned application that needs to be updated can be used in the MFP 1, the install control unit 234 requests downloading of the concerned application to the application server 3, and downloads the concerned application from the application server. 3. Then, the install control unit 234 installs the downloaded application in the MFP 1. This completes the updating of the concerned application.

Figure 24:
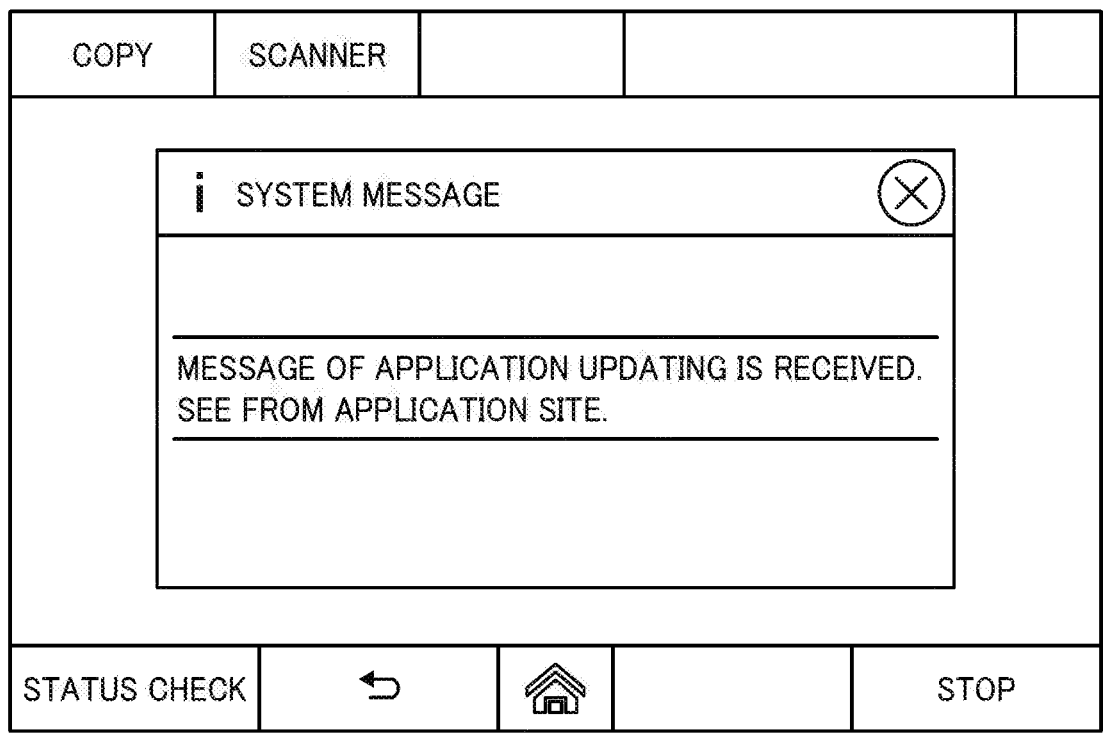
FIG. 24 illustrates an example of a notification message.

Returning to FIG. 7, the description is further continued. When the application that needs to be updated exists (typically, when the above-described update target application information is acquired from the application market server 2), the notification message reporting unit 217 instructs the notification message display module 223 to display a notification message on the operation panel 27 (see FIG. 24). After receiving this instruction, the notification message display module 223 displays the notification message on the operation panel 27. In this configuration, a combination of the notification message reporting unit 217 and the notification message display module 223 can be assumed as a functional unit (i.e., notification message display control unit) that displays the notification message when the application that needs to be updated exists, or any one of the notification message reporting unit 217 and the notification message display module 223 can be assumed as the notification message display control unit. FIG. 24 illustrates an example of the notification message, which is displayed on the operation panel 27.

Figure 25:
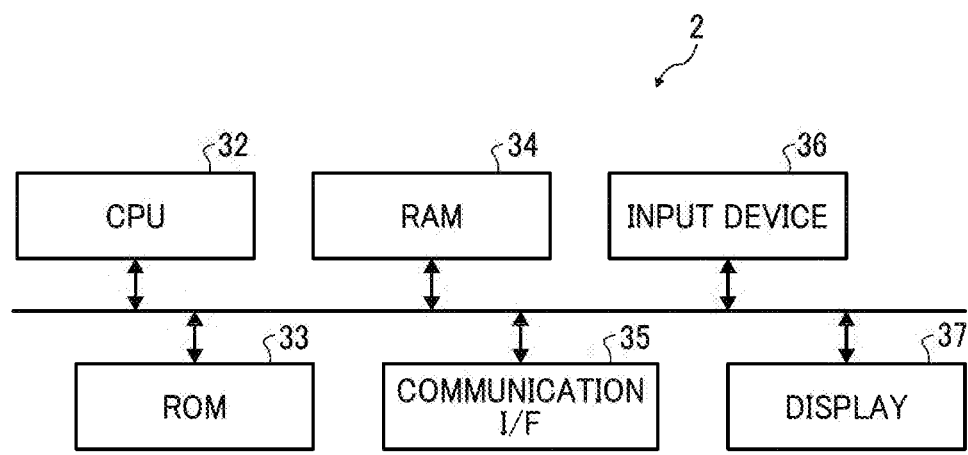
FIG. 25 illustrates an example of a hardware block diagram of an application market server.

Hereinafter, a description is given of a configuration of the application market server 2. FIG. 25 illustrates an example of a hardware block diagram of the application market server 2. Further, the hardware configurations of the application server 3 and the firmware providing server 4 are similar to that of FIG. 25.

As illustrated in FIG. 25, the application market server 2 includes, for example, a CPU 32, a ROM 33, a RAM 34, a communication I/F 35, an input device 36, and a display 37. The CPU 32 controls operations of the application market server 2 entirely. The ROM 33 is a nonvolatile memory that stores various data such as programs. The RAM 34 is a volatile memory that functions as a working area of various processing executed by the CPU 32. The communication I/F 35 is an interface used for connecting with the network 8. The input device 36 is a device used for inputting operations by a user, and includes, for example, a mouse and a keyboard. The display 37 is a device used for displaying various information, such as a liquid crystal display device.

Figure 26:
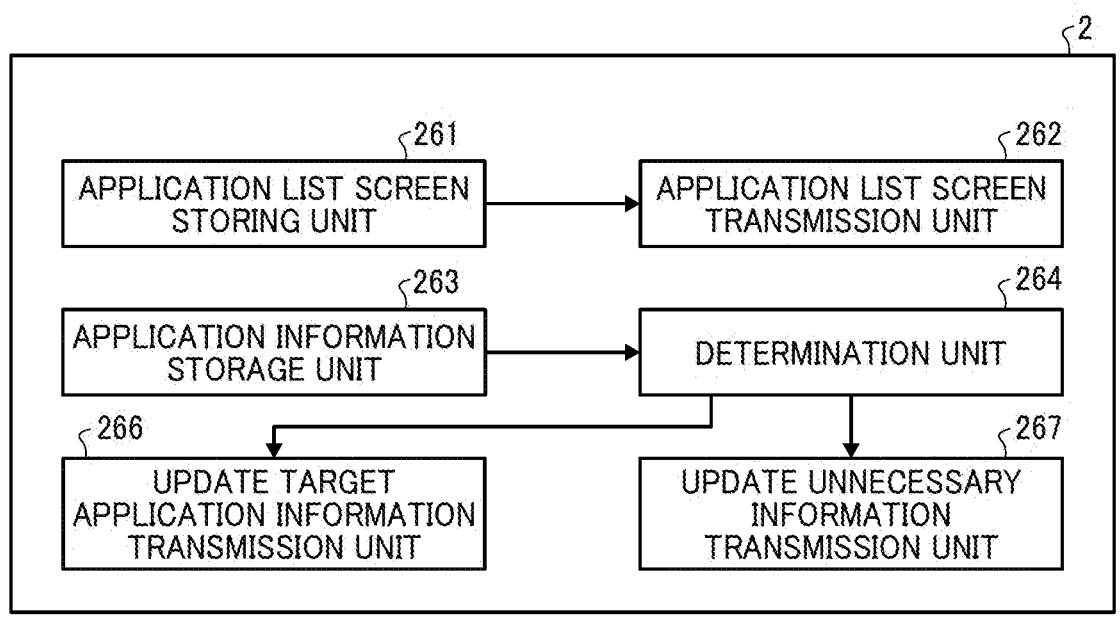
FIG. 26 illustrates an example of a functional block diagram of an application market server

FIG. 26 illustrates an example of a functional block diagram of the application market server 2. As illustrated in FIG. 26, the application market server 2 includes, for example, an application list screen storing unit 261, an application list screen transmission unit 262, an application information storage unit 263, a determination unit 264, an update target application information transmission unit 266, and an update unnecessary information transmission unit 267. For the convenience of description, FIG. 26 illustrates the functions described for the embodiment, but the functions of the application market server 2 are not limited thereto.

The application list screen storing unit 261 stores the above-described application list screen. After receiving the above described display request from the MFP 1, the application list screen transmission unit 262 transmits the application list screen stored in the application list screen storing unit 261 to the MFP 1 as a response.

The application information storage unit 263 stores application information associating the product ID, version, and application name for each of the applications to be displayed on the application list screen.

After receiving the above-described acquisition request from the MFP 1, the determination unit 264 determines whether the application that needs to be updated exists. In one embodiment, the determination unit 264 refers to application information stored in the application information storage unit 263 to determine whether a version, which is included in the application information and associated with one product ID identical to the same one product ID included in the concerned information group included in the above described acquisition request, matches a version included in the concerned information group, in which the determination unit 264 performs this determination processing for each information group composed of the product ID, version, and application name included in the acquisition request. If the version does not match, the determination unit 264 determines that the application identified by the product ID included in the concerned information group needs to be updated.

When the determination unit 264 determines that an application that needs to be updated exists, the update target application information transmission unit 266 transmits the above-described update target application information to the MFP 1 as a response, to the acquisition request. The update target application information includes information composed of the product ID, version, and application name used for identifying each of one or more applications for which the determination unit 264 determines that the updating is needed.

When the determination unit 264 determines that the application that needs to be updated does not exist, the update unnecessary information transmission unit 267 transmits the above-described update unnecessary information to the MFP 1 as a response to the acquisition request.

In one embodiment, the functions of the application list screen transmission unit 262, the determination unit 264, the update target application information transmission unit 266, and the update unnecessary information transmission unit 267 included in the application market server 2 can be implemented by executing programs stored in the ROM 33 using the CPU 32, but is not limited thereto, and can be implemented by, for example, a dedicated hardware circuit (e.g., semiconductor integrated circuit). Further, the application list screen storing unit 261 and the application information storage unit 263 are implemented by, for example, the ROM 33 or an auxiliary storage device such as an HDD. In the above described configuration, the functions of the application list screen transmission unit 262, the update target application information transmission unit 266, and the update unnecessary information transmission unit 267 can be implemented by a combination of the CPU 32 executing the programs and the communication I/F 35. For example, the function of the application list screen transmission unit 262 can be implemented when the CPU 32 controls the communication I/F 35 to transmit the application list screen to the MFP 1. Similarly, the function of the update target application information transmission unit 266 can be implemented when the CPU 32 controls the communication I/F 35 to transmit the update target application information to the MFP 1. Similarly, the function of the update unnecessary information transmission unit 267 can be implemented when the CPU 32 controls the communication I/F 35 to transmit the update unnecessary information to the MFP 1.

Figure 27A:
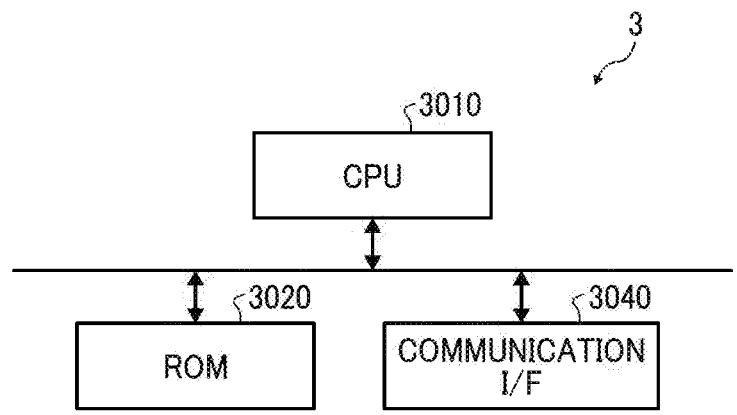
FIG. 27A illustrates an example of a hardware block diagram of an application server.
Figure 27B:
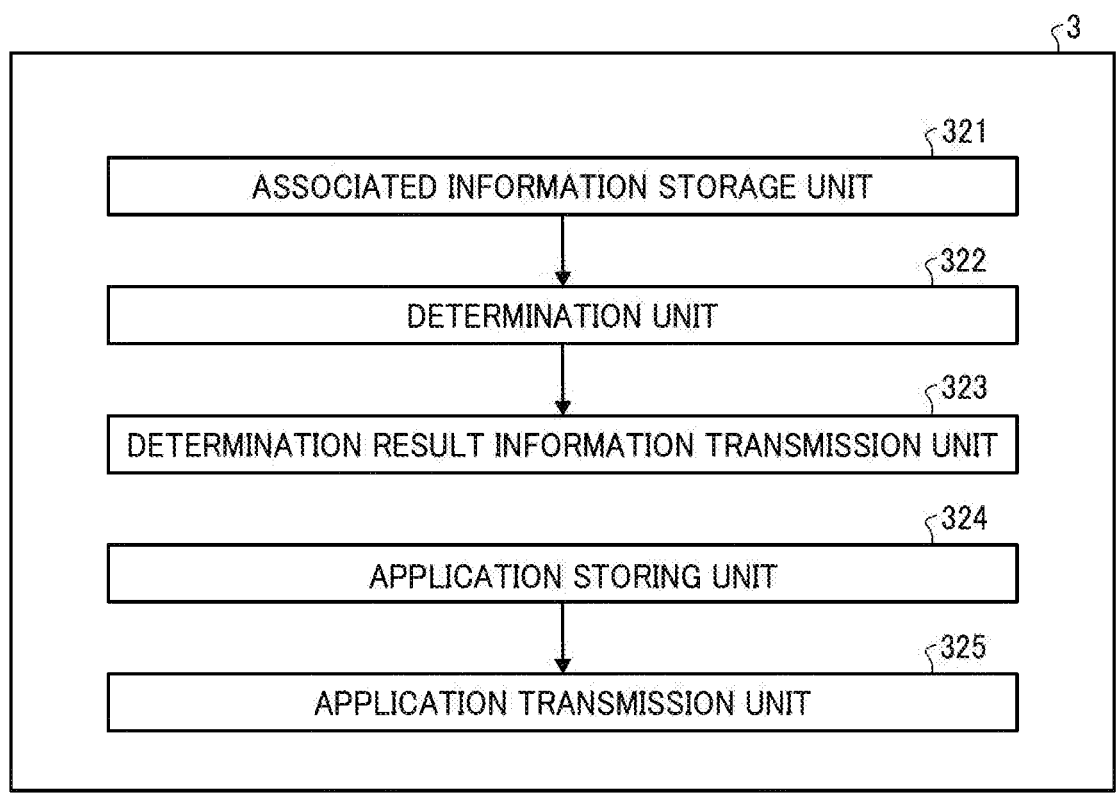
FIG. 27B illustrates an example of a functional block diagram of an application server.

Hereinafter, a description is given of an example of a functional configuration of the application server 3 with reference to FIG. 27B. As illustrated in FIG. 27A, the application server 3 includes, for example, a CPU 3010, a ROM 3020, and a communication I/F 3040. As illustrated in FIG. 27B, the application server 3 includes, for example, an associated information storage unit 321, a determination unit 322, a determination result information transmission unit 323, an application storing unit 324, and an application transmission unit 325. For the convenience of description, FIG. 27B illustrates the functions described for one embodiment, but the functions of the application server 3 are not limited thereto.

Figures 28, 29:
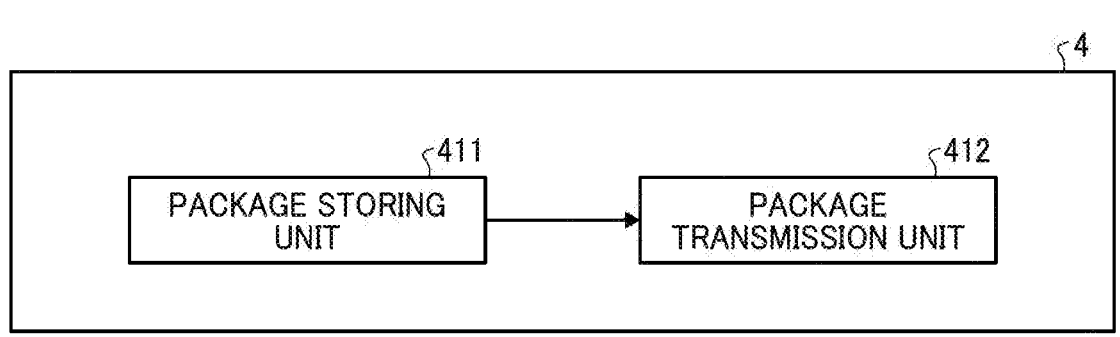
FIG. 28 illustrates an example of associated information.
FIG. 29 illustrates an example of a functional block diagram of a firmware providing server.

The associated information storage unit 321 stores associated information. The associated information includes, for example, application identification information, module identification information, and lower limit version information associated with each other for each of a plurality of applications, in which each of a plurality of application identification information (e.g., product ID) corresponds to each of the plurality of applications on a one-to-one basis. The module identification information (e.g., module ID) identifies a module used for providing a function necessary for using the application identified by the product ID, and the lower limit version information indicates a lower limit version value of the module identified by the module identification information, which means the lower limit version value is the minimum version value necessary for using the corresponding application. FIG. 28 illustrates an example of the associated information, which can be stored as a table, in a database, or any other equivalent memory structure.

The description of FIG. 27B is further continued. After receiving the determination request information from the MFP 1, the determination unit 322 performs the version validity determination processing. Specifically, the determination unit 322 determines whether the concerned application identified by the product ID included in the determination request information can be used in the MFP 1, based on the determination request information received from the MFP 1 and the associated information stored in the associated information storage unit 321.

More specifically, among the combinations of the product ID and the module ID included in the above-described associated information, the determination unit 322 identifies a combination of the product ID and the module ID that matches a combination of the product ID and the module ID included in the determination request information. Then, if the version value indicated by the lower limit version information associated with the identified combination is greater than the version value indicated by the version information included in the determination request information, the determination unit 322 determines that the application identified by the product ID included in the determination request information cannot be used in the MFP 1.

On the other hand, if the version value indicated by the lower limit version information associated with the identified combination is equal to or smaller than the version value indicated by the version information included in the above described determination request information, the determination unit 322 determines that the application identified by the product ID included in the determination request information can be used in the MFP 1.

The version validity determination processing in one embodiment can be performed as follows, but is not limited thereto. After receiving the determination request information from the MFP 1, the determination unit 322 identifies a product ID, among the plurality of product IDs included in the above-described associated information, that matches the product ID included in the above-described determination request information.

Then, the determination unit 322 identifies the module ID associated with the identified product ID in the above-described associated information, selects a module ID that matches the, identified module ID among the plurality of module IDs included in the above-described module information included in the above-described determination request information, and then selects version information associated with the selected module ID in the module information, in which information associating version information and each of a plurality of module IDs, corresponding on a one-to-one basis with a plurality of modules mounted on the MFP 1, is used as the module information. The module ID selected from the plurality of module IDs is referred to as "selected module ID," and the selected version information is referred to as "selected version information."

Then, among the combinations of the product ID and the module ID included in the above-described associated information, the determination unit 322 identifies a combination of a product ID and a module ID that matches a combination of the product ID included in the above-described determination request information and the above-described selected module ID. Then, if the version value indicating the lower limit version information associated with the identified combination is greater than the version value indicated by the above-described selected version information, the determination unit 322 determines that the application identified by the product ID included in the above-described determination request information cannot be used in the MFP 1.

On the other hand, if the version value indicating the lower limit version information associated with the identified combination is equal to or smaller than the version value indicated by the above-described selected version information, the determination unit 322 determines that the application identified by the product ID included in the determination request information can be executed in the MFP 1.

The determination result information transmission unit 323 (FIG. 27B) transmits the determination result information indicating a result of the version validity determination processing to the MFP 1. The application storing unit 324 stores a plurality of applications. The application transmission unit 325 transmits one or more applications, stored in the application storing unit 324, to the MFP 1 in response to a request from the MFP 1. The application server 3 employs the above-described configuration.

In one embodiment, the functions of the respective units of the application server 3, such as the determination unit 322, the determination result information transmission unit 323, and the application transmission unit 325 are implemented by executing programs stored in the ROM 3020 using the CPU 3010, but is not limited thereto. For example, at least a part of the functions of the respective units of the application server 3 can be implemented by, for example, a dedicated hardware circuit (e.g., semiconductor integrated circuit). Further, the above-described associated information storage unit 321 and the application storing unit 324 can be implemented by, for example, the ROM 3020. In the above-described configuration, the functions of the determination result information transmission unit 323 and the application transmission unit 325 can be implemented by a combination of the CPU 3010 executing programs and the communication I/F 3040. For example, the function of the determination result information transmission unit 323 can be implemented when the CPU 3010 controls the communication I/F 3040 to transmit the determination result information to the MFP 1. Further, the functions of the application transmission unit 325 can be implemented when the CPU 3010 controls the communication I/F 3040 to transmit the application to the MFP 1.

Hereinafter, a description is given of an example of a functional configuration of the firmware providing server 4 with reference to FIG. 29. As illustrated in FIG. 29, the firmware providing server 4 includes, for example, a package storing unit 411, and a package transmission unit 412. For the convenience of description, in FIG. 29 illustrates the functions described for the embodiment, but the functions of the firmware providing server 4 are not limited thereto.

The package storing unit 411 stores the latest version package. After receiving the package request from the MFP 1, the package transmission unit 412 transmits the latest version package stored in the package storing unit 411 to the MFP 1 as a response.

In one embodiment, the function of the package transmission unit 412 of the firmware providing server 4 described above is implemented by executing programs stored in the ROM 3020 using the CPU 3010, but is not limited thereto, and can be implemented by, for example, a dedicated hardware circuit (e.g., semiconductor integrated circuit). The package storing unit 411 can be implemented by, for example, the ROM 3020 or an auxiliary storage device such as an HDD. In the above-described configuration, the functions of the package transmission unit 412 can be implemented by a combination of the CPU 3010 executing programs and the communication I/F 3040. For example, the function of the package transmission unit 412 can be implemented when the CPU 3010 controls the communication LT 3040 to transmit the package to the MFP 1.

Figure 30:
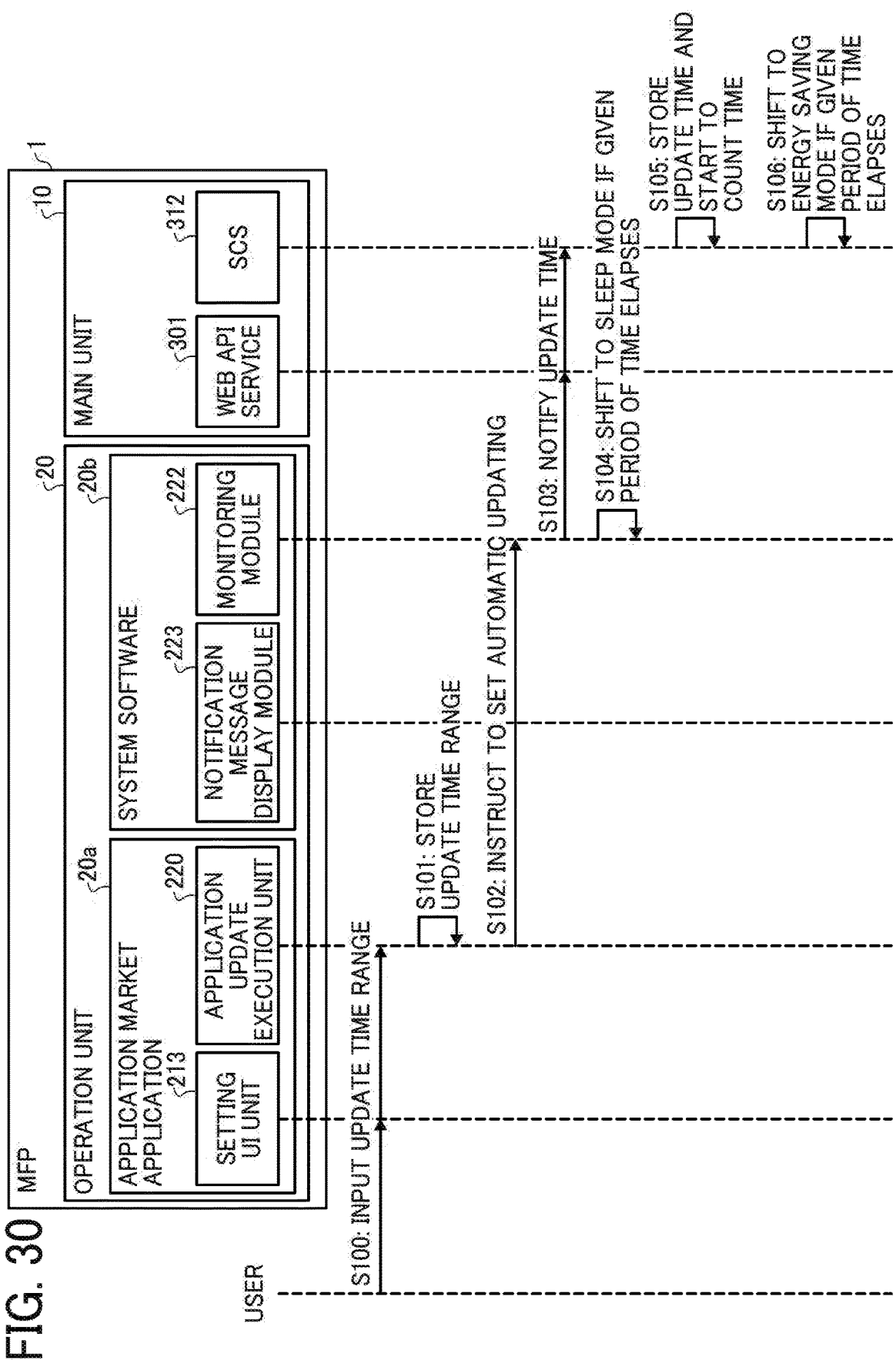
FIG. 30 illustrates an example of a sequence diagram of an operation procedure of an image forming apparatus when a user inputs an update time range.

Hereinafter, a description is given of an operation procedure of the system 100 of the embodiment. FIG. 30 illustrates an example of a sequence diagram of an operation procedure of the MFP 1 when a user inputs an update time range to the MFP 1.

First, the user inputs the update time range, selected by the user, on a screen (e.g., update time range setting screen) displayed by the setting UT unit 213 (step S100).

Then, the application update execution unit 220 (setting unit 214) stores the update time range received via the update time range setting screen in the storage unit (e.g., flash memory 24) of the operation unit 20 (step S101).

Then, the application update execution unit 220 (setting unit 214) instructs the monitoring module 222 to set an automatic updating (step S102). This instruction includes information indicating the update time range input by the user.

After receiving this instruction, the monitoring module 222 notifies the update time, set automatically and randomly in the operation unit 20 as previously described, to the main unit 10 (step 103).

Then, if a given period of time elapses without receiving a user operation on the operation unit 20, the monitoring module 222 shifts the mode of the operation unit 20 to the sleep mode (step S104).

Further, after receiving the update time from the monitoring module 222 via the Web API service 301, the SCS 312 of the main unit 10 stores the received update time in the storage unit (e.g., HDD 14) of the main unit 10, and starts to count the time (step S105). In this example case, the SCS 312 of the main unit 10 has a function of detecting whether the current time is equal to the update time.

Further, if the main unit 10 does not perform image processing such as printing (e.g., idle mode is being set) for a given period of time, the SCS 312 shifts the main unit 10 to the energy saving mode (step S106), which can perform a time counting function and communication function with the network 8 alone, in which the power consumption level of the energy saving mode is set smaller than the power consumption level of the normal mode in which the image processing can be executed. The processing status during the energy saving mode is optional, such that the energy saving mode can be a mode that activates one or more functions in addition to the time counting function and the communication function with the network 8. The energy saving mode is a mode in which the power consumption level is set smaller than the normal mode in which the image processing can be performed.

Figure 31:
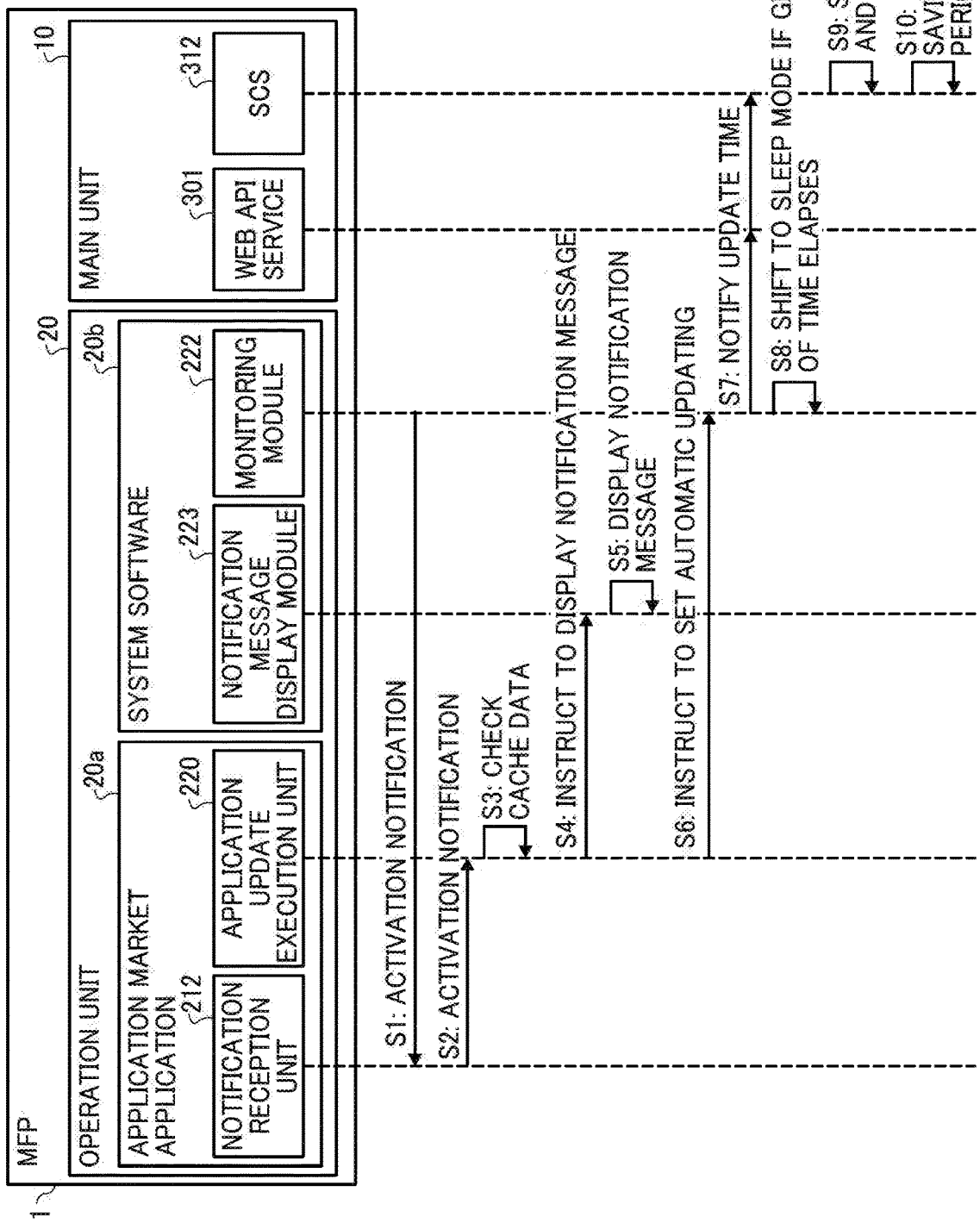
FIG. 31 illustrates an example of a sequence diagram of an operational procedure when activating an image forming apparatus.

FIG. 31 illustrates an example of a sequence diagram of an operation procedure when activating the MFP 1 including the operation unit 20.

When the MFP 1 is activated or booted (when the power supply is turned on), the monitoring module 222 transmits an activation or boot notification indicating that the MFP 1 is activated to the application market application 20a (step S1). In this example case, the activation of the MFP 1 includes a case of activating the main unit 10 and a case of activating the operation unit 20. Specifically, after detecting that the power switch of the main unit 10 is turned ON, or after detecting the return of the operation unit 20 from the sleep mode, the monitoring module 222 transmits the activation notification.

After receiving the activation notification, the notification reception unit 212 notifies the activation notification to the application update execution unit 220 (step S2).

After receiving the activation notification, the application update execution unit 220 checks whether the above-described cache data exists (step S3).

If the cache data exists, the application update execution unit 220 (notification message reporting unit 217) instructs the notification message display module 223 to display a notification message (step S4).

After receiving this instruction, the notification message display module 223 controls the operation panel 27 to display the notification message on the operation panel 27 (step S5).

Further, the application update execution unit 220 (setting unit 214) instructs the monitoring module 222 to set the automatic updating (step S6). This instruction includes information indicating the update time range stored in the storage unit of the operation unit 20, in which the update time range can be set by the user as illustrated in FIG. 30, or a default time range can be used as the update time range.

After receiving this instruction, the monitoring module 222 notifies the update time, set automatically and randomly in the operation unit 20 as previously described, to the main unit 10 (step S7).

Then, if a given period of time elapses without receiving a user operation on the operation unit 20. the monitoring module 222 shifts the mode of the operation unit 20 to the sleep mode (step S8).

Further, after receiving the update time from the monitoring module 222 via the Web API service 301, the SCS 312 of the main unit 10 stores the received update time in the storage unit (e.g., HDD 14) of the main unit 10, and starts to count the time (step S9).

Further, if the idle mode of the main unit 10 continues for a given period of time, the SCS 312 shifts the main unit 10 to the energy saving mode (step S10).

Hereinafter, a description is given of an example of an operation procedure of the MFP 1 when the counted time (i.e., current time) is equal to the update time with reference to FIG. 32.

When the SCS 312 of the main unit 10 detects that the counted time is equal to the update time (step S21), the SCS 312 notifies that the counted time is equal to the update time to the monitoring module 222 of the operation unit 20 (step S22).

After receiving this notification, the monitoring module 222 notifies that the counted time is equal to the update time to the notification reception unit 212 (step S23), and then the notification reception unit 212 notifies that the counted time is equal to the update time to the application update execution unit 220 (step S24).

After receiving this notification, the application update execution unit 220 (update target application information acquisition unit 215) transmits the above-described acquisition request to the application market server 2 (step S25). In this example case, the application update execution unit 220 transmits the above-described acquisition request to the application market server 2 via the NAPT function 320 of the main unit 10.

After receiving the acquisition request from the MFP 1, the application market server 2 determines whether an application that needs to be updated exists (step S26). The determination in step S26 is performed as described above, and the description is further continued by assuming that the application market server 2 determines that the application that needs to be updated exists.

In response to the acquisition request, the application market server 2 returns the update target application information to the MFP 1 (step S27).

The application update execution unit 220 (update target application information acquisition unit 215) acquires the update target application information from the application market server 2 via the NAPT function 320 of the main unit 10.

Then, the application update execution unit 220 calculates the number of applications that need to be updated, based on the update target application information (step S28).

Them the application update execution unit 220 (notification message reporting unit 217) instructs the notification message display module 223 to display a notification message including the number of applications that need to be updated, to inform that one or more applications that needs to be updated exist (step S29).

After receiving this instruction, the notification message display module 223 displays the notification message on the operation panel 27 (step S30).

Further, the application update execution unit 220 stores information indicating the number of applications that need to be updated, as cache data in the HDD 14 of the main unit 10 (step S31).

Further, the application update execution unit 220 (update control unit 216) transmits the above-described update request to the installer 221 to request updating of one or more applications that are not prohibited for updating among the applications that need to be updated (step S32). After receiving this update request, the installer 221 updates the one or more applications that need to be updated. Specifically, the installer 221 requests downloading of the to-be-updated application (target application) to the application server 3 (e.g., external server) via the NAPT function 320 of the main unit 10 (step S33), and then downloads the to-be-updated application from the application server 3 (step S34), wherein the details of steps S33 and the subsequent steps are described below with reference to FIG. 33. Then, the installer 221 installs the downloaded application in the MFP 1 (step S35).

In the above-described embodiment, the operation unit 20 includes a function (update execution unit) used for updating one or more applications installed in the operation unit 20. The update execution unit transmits the update time, which is a time to automatically update the to-be-updated application, to the main unit 10, and receives a notification from the main unit 10 that the update time is detected when the counted time (i.e., current time) is equal to the update time. Then, the update execution unit requests downloading of the to-be-updated application to the external server (e.g., application server 3) via the main unit 10, and installs the acquired application in the operation unit 20, with which the to-be-updated one or more applications among the applications already installed in the operation unit 20 are updated. The update execution unit includes, for example, the installer 221, and an update application unit (e.g., application market application 20a) including at least the update target application information acquisition unit 215 and the update control unit 216. The operation unit 20 includes, for example, the update application unit, and the installer 221.

As described above, the operation unit 20 and the main unit 10 can be set with different internet protocol (IP) addresses, and the main unit 10 can have a conversion unit (e.g., NAPT function 320) used for converting the IP address of the operation unit 20 into the IP address of the main unit 10. The update execution unit downloads the to-be-updated application from the external server via the conversion unit (e.g., NAPT function 320) of the main unit 10.

Figure 32:
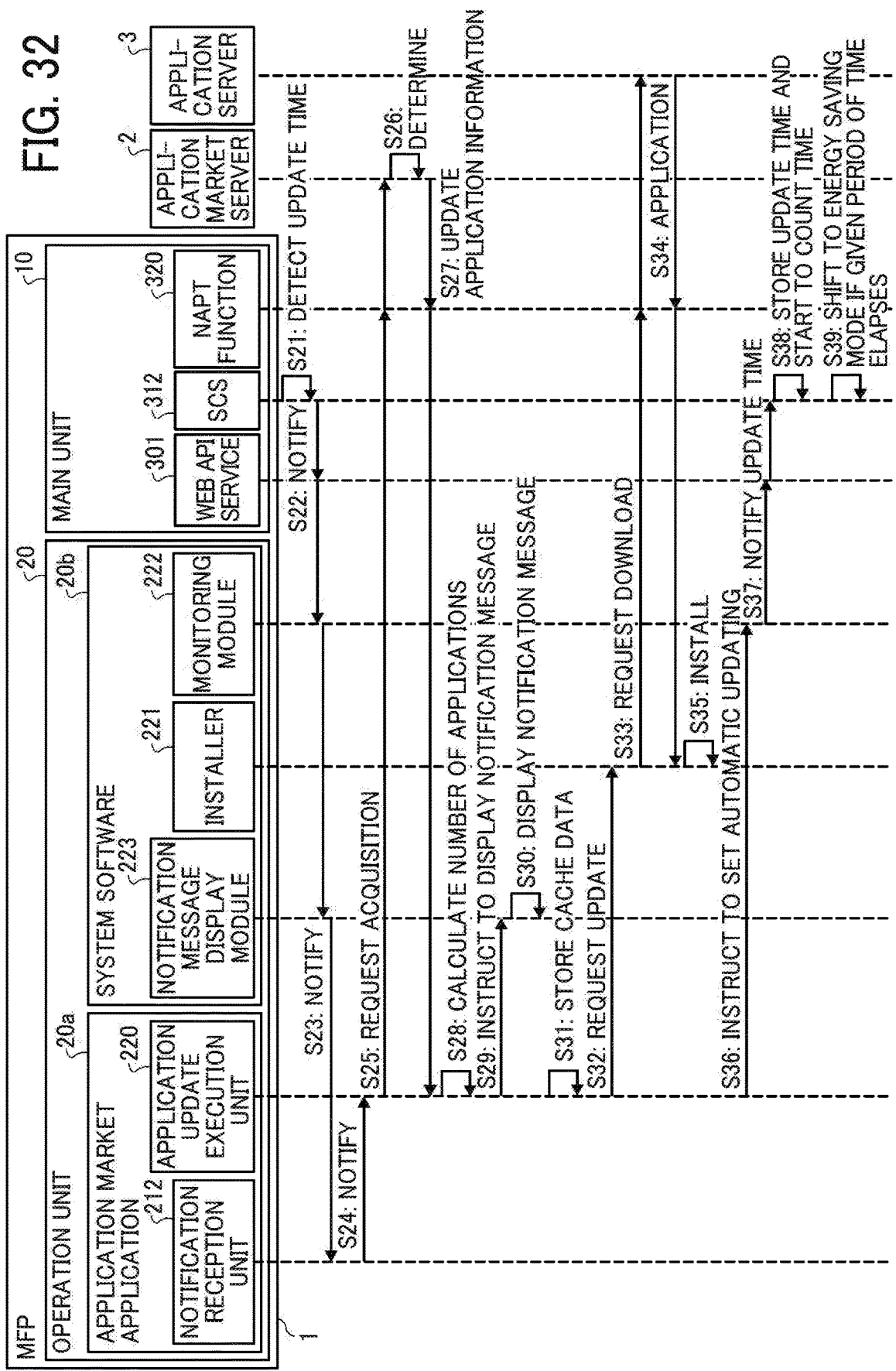
FIG. 32 illustrates an example of an operation procedure of a system when an update time is detected.

The description of FIG. 32 is further continued. The application update execution unit 220 (setting unit 214) instructs the monitoring module 222 to set the automatic updating (step S36).

After receiving this instruction, the monitoring module 222 notifies the update time to the main unit 10 (step S37).

After receiving the update time from the monitoring module 222 via the Web API service 301, the SCS 312 of the main unit 10 stores the received update time in the storage unit (e.g., HDD 14) of the main unit 10, and starts to count the time (step S38).

Further, if the idle mode of the main unit 10 continues for a given period of time, the SCS 312 shifts the main unit 10 to the energy saving mode (step S39).

Figure 33:
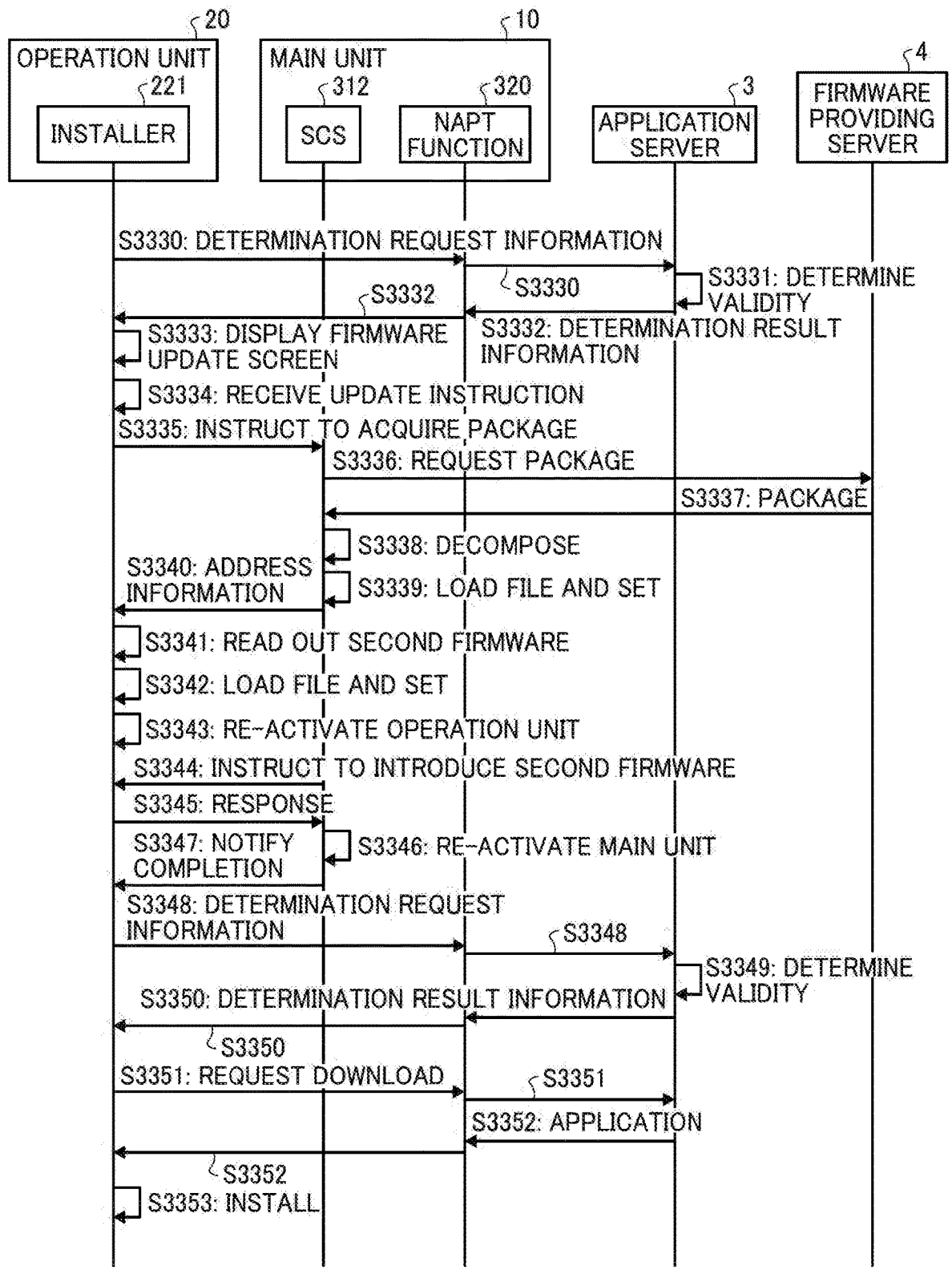
FIG. 33 illustrates an example of an operation procedure of a system when updating an application.

FIG. 33 illustrates an example of a sequence diagram of an operation procedure of the MFP 1 when updating an application after step S32 of FIG. 32.

The installer 221 transmits the above-described determination request information to the application server 3 via the NAPT function 320 of the main unit 10 (step S3330).

After receiving the determination request information from the main unit 10, the application server 3 performs the version validity determination processing (step S3331), and transmits determination result information indicating a result of the version validity determination processing to the MFP 1 (step S3332). Then, the installer 221 receives the determination result information from the application server 3 via the NAPT function 320 of the main unit 10.

If the determination request information received from the application server 3 indicates that the application, identified by the product ID included in the determination request information, cannot be used in the MFP 1, the installer 221 displays the firmware update screen (step S3333). Further, if the determination request information received from the application server 3 indicates that the application identified by the product ID included in the determination request information can be executed in the MFP 1, the sequence of step S3351 and subsequent steps, to be described later, is performed.

After step S3333, if the installer 221 receives the instruction to update the firmware via the firmware update screen (step S3334), the installer 221 instructs the SCS 312 (package acquisition unit 251) of the main unit 10 to acquire the latest version package (step S3335).

After receiving this instruction, the SCS 312 (package acquisition unit 251) transmits the above-described package request to the firmware providing server 4 (step S3336), acquires the latest version package from the firmware providing server 4 as a response, and then stores the acquired latest version package in the HDD 14 (step S3337).

Then, the SCS 312 (decomposition unit 252) decomposes the latest version package acquired in step S3337 into the second firmware and the third firmware (step S3338).

Then, the SCS 312 (first introduction control unit 254) loads files of programs and data defining the third firmware acquired by the decomposition in step S3338 to set necessary settings (step S3339). At this stage, the main unit 10 is not re-activated.

Then, the SCS 312 instructs the installer 221 to install the second firmware. As described above, in this example case, the SCS 312 (address information transmission unit 253) transmits address information identifying an area where the second firmware is stored in the HDD 14 to the installer 221 (step S3340).

The installer 221 (read unit 243) reads out the second firmware from the area in the HDD 14 identified by the address information received from the SCS 312 (step S3341).

Then, the installer 221 loads files such as programs and data defining the second firmware to set necessary settings (step S3342).

Then, after completing setting of the settings of the files, other than the files that cannot be modified when the operating system (OS) is being activated or booted, the operation unit 20 is re-activated, and the installer 221 sets the files that cannot be modified during the activation of OS (step S3343). This completes the introduction of the second firmware to the operation unit 20.

After the re-activation of the operation unit 20 is completed, and the operation unit 20 and the main unit 10 are reconnected, the SCS 312 of the main unit 10 instructs the installer 221 to introduce the second firmware again (step S3344).

At this stage, since the introduction of the second firmware to the operation unit 20 has been completed, the installer 221, receiving this instruction, immediately returns a response indicating that the introduction of the second firmware has been completed to the SCS 312 (step S3345).

After receiving this response, the SCS 312 (first introduction control unit 254) reboots or re-activates the main unit 10, and sets the files, that cannot be modified during the boot or activation of OS (step S3346). This completes the introduction of the third firmware to the main unit 10.

After the processing in step S3346 is completed, the SCS 312 notifies that the introduction of the third firmware to the main unit 10 has been completed to the installer 221 (step S3347).

After receiving this notification, the installer 221 requests the application server 3 to perform the version validity determination processing again. More specifically, the installer 221 re-acquires the module information from a system module of the main unit 10, and transmits the re-acquired module information, and the determination request information including the product ID identifying the application that needs to be updated (i.e., a product ID included in the update request) to the application server 3 via the NAPT function 320 of the main unit 10 (step S3348).

As described above, after receiving the determination request information, the application server 3 performs the above-described version validity determination processing (step S3349), and transmits the determination result information indicating a result of the version validity determination to the MFP 1 (step S3350). Then, the installer 221 receives the determination result information from the application server 3 via the NAPT function 320 of the main unit 10.

If the determination request information received from the application server 3 indicates that the application identified by the product ID included in the determination request information can be executed in the MFP 1, the installer 221 (install control unit 234) requests downloading of the application to the application server 3 via the NAPT function 320 of the main unit 10 (step S3351), and downloads the application from the application server 3 (step S 3352).

Then, the installer 221 (install control unit 234) installs the downloaded application in the MFP 1 (step S3353).

Figure 34:
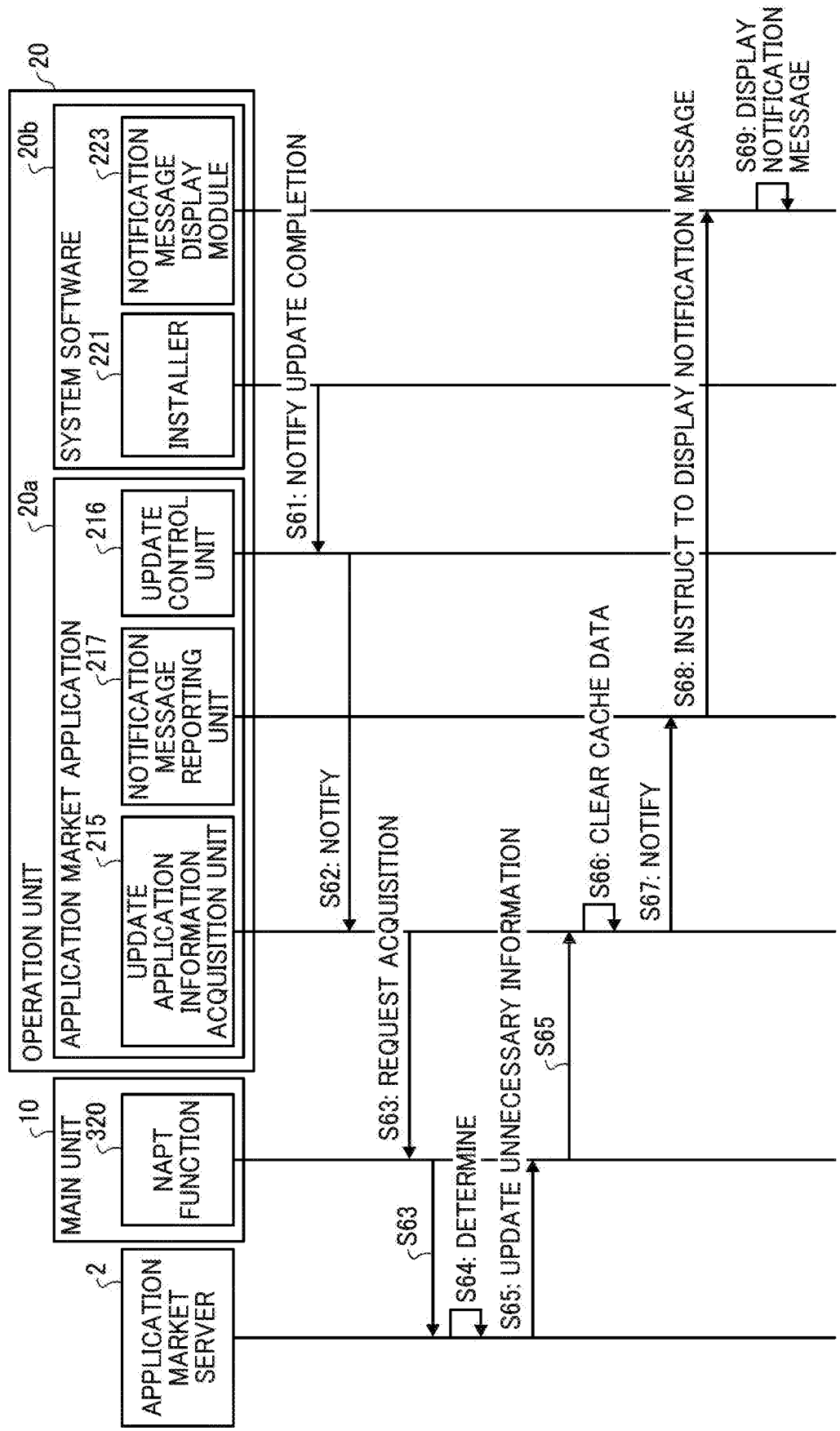
FIG. 34 illustrates an example of an operation procedure of a system after completing updating of an application.

Hereinafter, a description is given of an example of an operation procedure of the MFP 1 after completing the updating of an application with reference to FIG. 34.

After completing the updating of the update-needed application, identified by the product ID included in the update request, the installer 221 transmits an update completion notification indicating a completion of updating of the application to the update control unit 216 (step S61).

After receiving the update completion notification, the update control unit 216 notifies the update completion notification to the update target application information acquisition unit 215 to inform that the updating of the application has been completed (step S62).

After receiving the update completion notification, the update target application information acquisition unit 215 transmits the above-described acquisition request to the application market server 2 via the NAPT function 320 of the main unit 10 (step S63).

After receiving the acquisition request from the MFP 1, the application market server 2 determines whether the application that needs to be updated exists (step S64). The determination in step 564 is performed as described above, and the description is further continued by assuming that it is determined that, there is no application that needs to be updated.

In response to the acquisition request, the application market server 2 transmits the update unnecessary information to the MFP 1 (step S65). Then, the update target application information acquisition unit 215 receives the update unnecessary information from the application market server 2 via the NAPT function 320 of the main unit 10.

If the update target application information acquisition unit 215 acquires the update unnecessary information from the application market server 2, the update target application information acquisition unit 215 clears the cache data stored in the HDD 14 of the main unit 10 (step S66).

Then, the update target application information acquisition unit 215 notifies that there is no application that needs to be updated to the notification message reporting unit 217 (step S67).

After receiving this notification, the notification message reporting unit 217 instructs the notification message display module 223 to display a notification message indicating that all of applications are updated to the latest applications (step S68).

Figure 35:
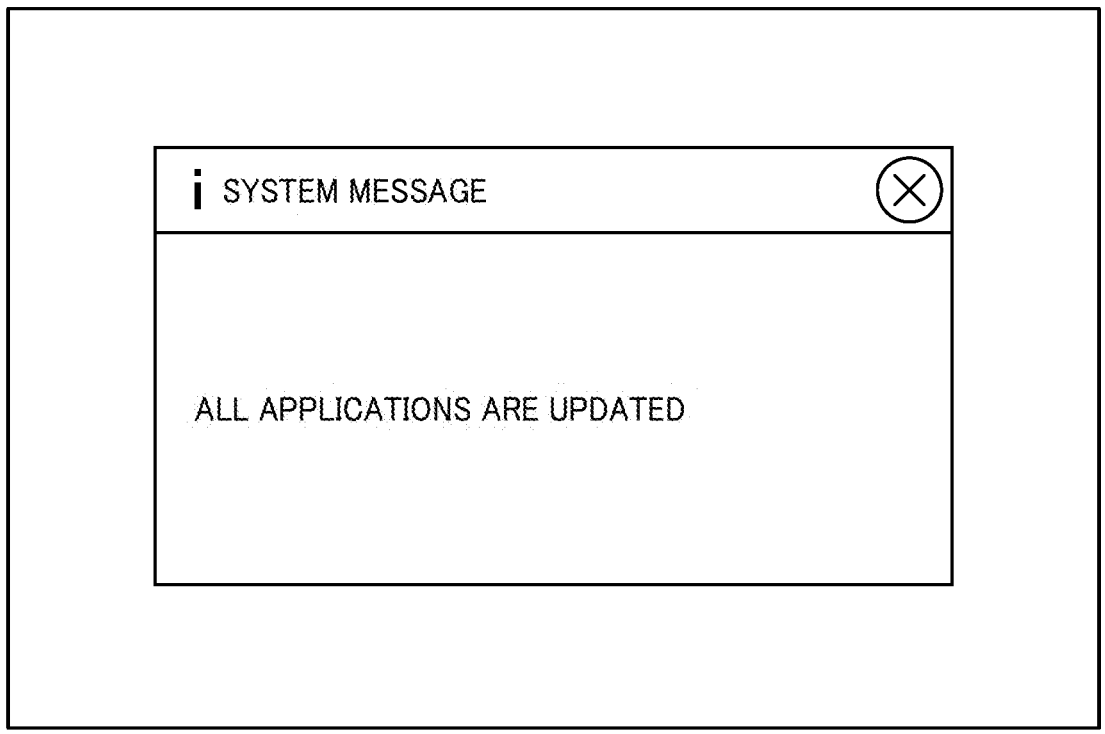
FIG. 35 illustrates an example of a notification message.

After receiving this instruction, the notification message display module 223 displays the notification message on the operation panel 27 (step S69). FIG. 35 illustrates an example of the notification message displayed in step S69.

As described above, the MFP 1 acquires the update target application information indicating that one or more applications that need to be updated, among the one or more applications installed in the MFP 1, from the application market server 2, and controls the updating of the one or more applications indicated by the acquired update target application information. In one embodiment, when an application is automatically updated, the MFP 1 is not required to determine whether the application that needs to be updated exists, but the MFP 1 can be configured to acquire information (update target application information) indicating an application that needs to be updated from the application market server 2, with which the processing can be performed efficiently. That is, the above-described embodiment can automatically and efficiently update applications installed in the MFP 1.

Conventionally, the main unit includes one CPU and one OS, and the operation unit includes another CPU and another OS, which are different with each other. Although the main unit and the operation unit are combined as one unit in appearance, the main unit and the operation unit are controlled independently, and therefore, the operation unit has no configuration to communicate with an external server via the main unit having a network interface.

In the above-described embodiment, the operation unit 20 can communicate with an external server such as the application market server 2 using the address conversion function of the NAPT function 320 and the network interface (e.g., communication I/F 15) included in the main unit 10, with which the operation unit 20 can download the application update information, the application list screen, and one or more applications to be, installed in the operation unit 20 from the external server. Further, since the main unit 10 and the operation unit 20 are set with different IP addresses and port numbers, the image forming apparatus are set with, for example, two IP addresses, but the main unit 10 and the operation unit 20 can be identified as a single apparatus or device from the external server when the communication is performed between the operation unit 20 and the external server via the main unit 10 by using the, address conversion function of the NAPT function 320.

Second Embodiment:

Hereinafter, a description is given of a second embodiment. The portions common to the first embodiment are omitted as appropriate. As described above in the first embodiment, the main unit 10 includes, for example, the SCS 312 as a first energy saving control unit, and the operation unit 20 includes, for example, the monitoring module 222 as a second energy saving control unit. When the operation unit 20 does not receive a user operation for a given time period or more, the second energy saving control unit shifts the mode of the operation unit 20 to the energy saving mode, in which the power consumption is set smaller than that in the normal mode of the operation unit 20 that the operation unit 20 is normally operable. Further, when the idle mode of the main unit 10 continues for a given period of time, the first energy saving control unit shifts the mode of the main unit 10 to the energy saving mode, in which the power consumption in the energy saving mode is set smaller than that in the normal mode that the main unit 10 is normally operable.

In the second embodiment, when the counted time (i.e., current time) is equal to the update time while the operation unit 20 is in the energy saving mode and the main unit 10 is in the energy saving mode, the monitoring module 222 (second energy saving control unit) of the operation unit 20 returns the operation unit 20 to the normal mode while the SCS 312 (first energy saving control unit) of the main unit 10 maintains the main unit 10 in the energy saving mode. As described above, during the energy saving mode of the main unit 10, the main unit 10 can be configured to activate the time counting function and the function to communicate with the network 8, but not limited thereto.

In the same manner as in the first embodiment, when the counted time (i.e., current time) is equal to the update time in the second embodiment, the SCS 312 notifies that the counted time is equal to the update time to the monitoring module 222. At this stage, the SCS 312 maintains the main unit 10 in the energy saving mode. After receiving the notification from the SCS 312, the monitoring module 222 returns the operation unit 20 to the normal mode, and notifies that the counted time is equal to the update time to the application market application 20*a* (notification reception unit 212). The subsequent operation is similar to that of the above described first embodiment. As to the second embodiment, the power consumption of the MFP 1 can be further reduced.

In each of the embodiments described above, the SCS 312 of the main unit 10 has a function of detecting whether the counted time is equal to the update time, but is not limited thereto. For example, the monitoring module 222 of the operation unit 20 can be configured to detect whether the counted time is equal to the update time by storing the set update time and counting the time. In this configuration, if the monitoring module 222 detects that the counted time is equal to the update time, the monitoring module 222 notifies that the counted time is equal to the update time to the application market application 20*a*. The subsequent operation is similar to that of the above-described first embodiment. In this configuration, the monitoring module 222 can be configured to notify or not to notify that the counted time is equal to the update time to the main unit 10. In the second embodiment, even if the SCS 312 of the main unit 10 receives a notification that the counted time is equal to the update time from the monitoring module 222 of the operation unit 20 when the main unit 10 is being set with the energy saving mode, the SCS 312 maintains the main unit 10 at the energy saving mode.

Although the description of the present disclosure has been made based on the embodiments described above, the present disclosure is not limited to the requirements described in the above embodiments. Numerous additional modifications and variations are possible in light of the above teachings. It is therefore to be understood that, within the scope of the appended claims, the disclosure of this patent specification can be practiced otherwise than as specifically described herein. Further, various inventions can be formed by appropriately combining the plurality of components disclosed in each of the above described embodiments. For example, some components can be removed from the components illustrated in each embodiment. Further, components of different embodiments and variations can be suitably combined. The above-described embodiments provide the image forming apparatus, system, and control method that can automatically and efficiently update one or more applications installed in the image forming apparatus.

In the above described embodiments, the main unit 10 and the operation unit 20 are operated independently of each other using different operating systems, but is not limited thereto. For example, the main unit 10 and the operation unit 20 can be operated using the same operating system. The above-described embodiment is applied to the image forming apparatus such as the MFP 1, but the above-described embodiment can be applied to any machine or apparatus including a plurality of units operable using different operating systems, and communicable with one or more information processing apparatuses, such as industrial machines including an operation unit and a working unit, vehicles including an operation unit and a driving unit, but is not limited these.

In particular, while the above-described embodiment describes the example case of image forming apparatus including an operation unit and a main unit, one or more embodiments is applicable to many other apparatuses or systems. In one example, such a system can include an in-vehicle device to be mounted on a vehicle. Specifically, the in-vehicle device includes a navigation device and an electronic control unit (ECU). The navigation device provides navigation for the vehicle to guide a driver for a destination using, for example, map data, global positioning system (GPS) data, and other data that is received from the ECU. The navigation device is installed with an OS and various applications. In operation, the navigation device receives a user instruction, and displays information generated according to the user instruction. While the navigation device can be a dedicated drive, any information terminal such as a mobile phone can be used as the navigation device. The ECU is a group of electronic control units that control the vehicle, such as an ECU to control engine, steering, or break, an ECU to control a meter and an air conditioner, or the like. The ECU can transmit information related to driving, such as a driving speed or driving direction, to the navigation device. With such a configuration, the navigation device can operate as the operation unit, and the ECU can operate as the main unit. Specifically, the navigation device can automatically store applications that need to be updated, via the ECU. In such case, it is desirable that the update time is any time during when the vehicle is not driving. In one example, such a system can include an industrial machine. Specifically, the industrial machine includes a controller such as a computer, and a working unit such as tools or robots in a facility. In operation, the controller can automatically store applications that need to be updated, via the working unit. Other examples of system include household appliances such as a refrigerator, air conditioner, washing machine, microwave, and television, each of which can be controllable by a remote controller. The remote controller can be implemented by a smart phone of the user. Specifically, the remote controller can automatically store applications that need to be updated, via the appliance Further, for example, the application market server 2 and the application server 3 can be integrated as one server. The above-described embodiments are applied to the image forming apparatus such as MFP 1, but the above-described embodiments can be applied to any machine or apparatus including a plurality of units operable using different operating systems, and communicable with one or more information processing apparatuses, such as industrial machines including an operation unit and a working unit, vehicles including an operation unit and a driving unit, but is not limited to these.

Further, the programs executed in the system 100 (MFP 1, the application market server 2, the application server 3, and the firmware providing server 4 of the above-described embodiments can be recorded on a computer-readable recording medium such as compact disk read-only memory (CD-ROM), flexible disk (FD), compact disk recordable (CD-R), digital versatile disk (DVD), universal serial bus (USB), or the like in a file of an installable format or executable format, or can be arranged to be provided or distributed over a network such as the Internet.

Further, various programs can be provided in advance in a ROM or the like. Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions. As described above, the present inventions can be implemented in any convenient form, for example using dedicated hardware, or a mixture of dedicated hardware and software. The present inventions can be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present inventions can be implemented as software, each and every aspect of the present inventions thus encompasses computer software implementable on a programmable device. The computer software can be provided to the programmable device using any storage medium for storing processor readable code such as a floppy disk, hard disk, CD ROM, magnetic tape device or solid state memory device.

The invention claimed is:

1. An image forming apparatus, comprising:
a first device including first circuitry and at least one of a printer and a scanner; and
a second device to operate the first device, the second device including second circuitry configured to install, on a memory of the second device, one or more applications for executing image processing using the printer or the scanner, wherein the second circuitry is configured to
when determining that a current time is equal to an update time set within an update time range defined by a user, acquire, from a server via the first device and a network, update target application information indicating a target application among the one or more applications installed in the second device,
request, to the server via the first device and the network, downloading of the target application,
acquire the target application from the server via the first device and the network, and
install the acquired target application in the second device,
wherein the second circuitry is further configured to shift a mode of the second device to a second device energy saving mode when a given period of time elapses without receiving an operation performed by a user, wherein power consumption in the second device energy saving mode is set lower than power consumption in a second device normal mode in which the second device is operated;
the first circuitry is configured to shift a mode of the first device to a first device energy saving mode when an idle mode of the first device continues for a given period of time, wherein power consumption in the idle mode in which the first device does not perform any image processing is set lower than power consumption in a first device normal mode in which the first device is operated; and
when it is detected that the current time equals the update time while the second device is in the second device energy saving mode and the first device is in the first device energy saving mode, the second circuitry is further configured to return the second device to the second device normal mode while the first circuitry is configured to maintain the first device in the first device energy saving mode.

2. The image forming apparatus of claim 1, wherein the second circuitry is further configured to transmit, to the first circuitry of the first device, the update time used for automatically updating the application; and
the first circuitry is further configured to determine whether the current time is equal to the update time, and notify the second circuitry that the current time is equal to the update time when determining that the current time is equal to the update time.

3. The image forming apparatus of claim 2, wherein the second circuitry is further configured to transmit, to the server via the first device and the network, an acquisition request requesting the update target application information, after the first circuitry notifies the second circuitry that the current time is equal to the update time; and acquire the update target application information from the server via the first device and the network as a response to the acquisition request.

4. The image forming apparatus of claim 1, wherein the second circuitry is further configured to set the update time based on the update time range, and determine whether the set update time equals the current time; and the second circuitry is further configured to transmit the acquisition request to the server via the first device and the network in response to determining that the current time equals the set update time.

5. The image forming apparatus of claim 4, wherein the second circuitry is further configured to automatically select a time within the update time range randomly and set the selected time as the update time.

6. The image forming apparatus of claim 1, wherein when the target application exists, the second circuitry is further configured to display, on a display, a message notifying that the target application exists.

7. The image forming apparatus of claim 1, wherein the second device is configured to receive the operation performed by the user, and the first device includes the printer to form an image on a recording medium.

8. The image forming apparatus of claim 1, wherein when an updating of firmware is required to use the target application indicated by the update target application information, the second circuitry is further configured to update the firmware.

9. The image forming apparatus of claim 1, wherein the first device includes the first circuitry executing a first operating system, and the second device includes the second circuitry executing a second operating system, and an installer.

10. The image forming apparatus of claim 1, wherein the first device is set with a first internet protocol (IP) address, and the second device is set with a second internet protocol (IP) address, different from the first IP address, and the first circuitry is further configured to convert the second IP address of the second device into the first IP address of the first device when the second circuitry acquires the target application from the server via the first circuitry of the first device and the network.

11. A system, comprising:

a server; and an image forming apparatus communicable with the server via a network, the image forming apparatus including a first device having first circuitry a second device having second circuitry, wherein the image forming apparatus transmits an acquisition request for requesting update target application information indicating a target application, among one or more applications installed in the image forming apparatus, acquires the update target application information from the server as a response, and updates the target application indicated by the acquired update target application information, wherein the server determines whether the target application exists when the server receives the acquisition request from the image forming apparatus, and transmits the update target application information to the image forming apparatus as a response to the acquisition request, when the server determines that the target application exists, and wherein the second circuitry is configured to shift a mode of the second device to a second device energy saving ode when a given period of time elapses without receiving an operation performed by a user, wherein power consumption in the second device enemy saving mode is set lower than power consumption in a second device normal mode in which the second device is operated;

the first circuitry is configured to shift a mode of the first device to a first device energy saving mode when an idle mode of the first device continues for a given period of time, wherein power consumption in the idle mode in which the first device does not perform any image processing is set lower than power consumption in a first device normal mode in which the first device is operated; and when it is detected that a current-time equals an update time while the second device is in the second device energy saving mode and the first device is in the first device energy saving mode, the second circuitry is further configured to return the second device to the second device normal mode while the first circuitry is configured to maintain the first device in the first device energy saving mode.

12. A method of updating applications installed in a second device of an image forming apparatus, the image forming apparatus including a first device that includes first circuitry and at least one of a printer and a scanner, and the second device, which operates the first device, the second device including second circuitry to install, on a memory of the second device, one or more applications for executing image processing using the printer or the scanner, the method comprising:

when determining that a current time is equal to an update time set within an update time range defined by a user, acquiring, from a server via the first device and a network, update target application information indicating a target application among the one or more applications installed in the second device;

requesting, to the server via the first device and the network, downloading of the target application;

acquiring the target application from the server via the first device and the network; and installing the acquired target application in the second device, wherein the method further comprises shifting a mode of the second device to a second device energy saving mode when a given period of time elapses without receiving an operation performed by a user, wherein power consumption in the second device energy saving mode is set lower than power consumption in a second device normal mode in which the second device is operated;

shifting a mode of the first device to a first device energy saving mode when an idle mode of the first device continues for a given period of time, wherein power consumption in the idle mode in which the first device does not perform any image processing is set lower than power consumption in a first device normal mode in which the first device is operated; and when it is detected that the current time equals the update time while the second device is in the second device energy saving mode and the first device is in the first device energy saving mode, returning the second device to the second device normal mode while maintaining the first device in the first device energy saving mode.

13. The method of claim 12, further comprising:

transmitting, to the first circuitry of the first device, the update time used for automatically updating the application;

receiving, from the first circuitry of the first device, a notification that the current time is equal to the update time;

transmitting, to the server via the first device and the network, an acquisition request requesting the update target application information, after the first circuitry receives the notification; and acquiring the update target application information from the server as a response to the acquisition request.

14. The method of claim 12, further comprising:

setting the update time based on the update time range, and determine whether the set update time equals the current time; and transmitting the acquisition request to the server via the first device and the network in response to determining that the current time equals the set update time.

15. The method of claim 14, further comprising automatically selecting a time within the update time range randomly, and setting the selected time as the update time.

16. The method of claim 12, wherein when the target application exists, the method further comprises displaying, on a display, a message notifying that the target application exists.

17. The method of claim 12, wherein the second device is configured to receive the operation performed by the user; and the first device includes the printer to form an image on a recording medium.

18. The method of claim 12, further comprising:

when an updating of firmware is required to use the target application indicated by the update target application information, updating the firmware.

* * * * *